(12) United States Patent
Tanimoto

(10) Patent No.: US 9,191,320 B2
(45) Date of Patent: Nov. 17, 2015

(54) RELAY SERVER AND RELAY COMMUNICATION SYSTEM

(75) Inventor: Yoshifumi Tanimoto, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 134 days.

(21) Appl. No.: 14/112,716

(22) PCT Filed: Apr. 2, 2012

(86) PCT No.: PCT/JP2012/002267
§ 371 (c)(1),
(2), (4) Date: Oct. 18, 2013

(87) PCT Pub. No.: WO2012/144134
PCT Pub. Date: Oct. 26, 2012

(65) Prior Publication Data
US 2014/0056305 A1  Feb. 27, 2014

(30) Foreign Application Priority Data

Apr. 21, 2011  (JP) .................................. 2011-095323
May 25, 2011  (JP) .................................. 2011-116966

(51) Int. Cl.
*H04L 12/741* (2013.01)
*H04L 12/46* (2006.01)
*H04L 29/06* (2006.01)

(52) U.S. Cl.
CPC .......... *H04L 45/745* (2013.01); *H04L 12/4625* (2013.01); *H04L 12/4641* (2013.01); *H04L 65/1069* (2013.01)

(58) Field of Classification Search
None
See application file for complete search history.

(56) References Cited

U.S. PATENT DOCUMENTS

| 7,036,143 | B1* | 4/2006  | Leung et al. ..................... 726/15 |
| 7,061,902 | B1* | 6/2006  | Fukuyama et al. ........... 370/352 |
| 7,120,677 | B1* | 10/2006 | Berger et al. ................. 709/219 |
| 7,188,179 | B1* | 3/2007  | Hanson et al. ................ 709/227 |
| 7,366,188 | B2* | 4/2008  | Kim ............................... 370/401 |
| 7,437,457 | B1* | 10/2008 | Eisendrath et al. .......... 709/225 |
| 7,624,265 | B1* | 11/2009 | Slyva et al. ................... 713/168 |
| 7,630,358 | B1* | 12/2009 | Lakhani et al. ............... 370/351 |
| 7,886,062 | B2* | 2/2011  | Oguchi et al. ................ 709/228 |
| 8,085,793 | B2* | 12/2011 | Krishnan et al. ............. 370/400 |
| 2001/0054157 | A1* | 12/2001 | Fukumoto .................... 713/201 |
| 2002/0129150 | A1* | 9/2002 | Jung ............................. 709/227 |
| 2003/0048796 | A1* | 3/2003 | Yabe et al. .................... 370/401 |

(Continued)

FOREIGN PATENT DOCUMENTS

JP  2002-217938 A  8/2002

OTHER PUBLICATIONS

Official Communication issued in International Patent Application No. PCT/JP2012/002267, mailed on May 1, 2012.

*Primary Examiner* — Dung B Huynh
(74) *Attorney, Agent, or Firm* — Keating & Bennett, LLP

(57) ABSTRACT

A relay server presents, to an operator having made a login request, a list of connecting-target apparatuses to which the operator is able to connect. When, for example, a client terminal is selected from the list, the relay server stores, as address filter information of the relay server, an address of a communication apparatus operated by the operator, and transmits the address filter information to the client terminal. The relay server stores address filter information received from the client terminal. Then, a routing session for a VPN is established between the relay server and the client terminal, and routing of a packet is performed based on the address filter information.

10 Claims, 28 Drawing Sheets

(56) References Cited

U.S. PATENT DOCUMENTS

| | | | |
|---|---|---|---|
| 2003/0074451 A1* | 4/2003 | Parker et al. | 709/227 |
| 2003/0185207 A1* | 10/2003 | Nakahara | 370/389 |
| 2003/0219011 A1* | 11/2003 | Han | 370/352 |
| 2004/0013099 A1* | 1/2004 | O'Neill | 370/338 |
| 2004/0114590 A1* | 6/2004 | Harris | 370/389 |
| 2004/0185834 A1* | 9/2004 | Sommers et al. | 455/414.1 |
| 2005/0036509 A1* | 2/2005 | Acharya et al. | 370/466 |
| 2005/0177515 A1* | 8/2005 | Kalavade et al. | 705/52 |
| 2007/0079368 A1* | 4/2007 | Takeyoshi et al. | 726/15 |
| 2008/0045267 A1* | 2/2008 | Hind et al. | 455/557 |
| 2009/0006747 A1* | 1/2009 | Otsuka | 711/115 |
| 2009/0168788 A1* | 7/2009 | Den et al. | 370/401 |
| 2009/0228962 A1* | 9/2009 | Pathak | 726/5 |
| 2010/0020738 A1* | 1/2010 | Inouchi et al. | 370/315 |
| 2011/0085470 A1* | 4/2011 | Park et al. | 370/254 |
| 2012/0210344 A1* | 8/2012 | McCoy et al. | 725/25 |
| 2012/0210375 A1* | 8/2012 | Wong et al. | 725/93 |

* cited by examiner

Fig. 5

CONNECTION PERMISSION INFORMATION

| OPERATOR ID | IDENTIFICATION INFORMATION OF CONNECTED-SIDE APPARATUS |
|---|---|
| Op1 | Server3@relaysystem.net |
| Op2 | Client42@Server3.relaysystem.net<br>Client47@Server3.relaysystem.net |
| Op3 | Client42@Server3.relaysystem.net |
| Op4 | Client42@Server3.relaysystem.net |

Fig. 6

OPERATOR INFORMATION

| OPERATOR ID | PASSCODE | USED APPARATUS INFORMATION |
|---|---|---|
| Op1 | abc | Client21@Server2.relaysystem.net<br>/Server2@relaysystem.net |
| Op2 | def | Server2@relaysystem.net |
| Op3 | ghi | |
| Op4 | jkl | |

Fig. 8

ROUTING SESSION INFORMATION

| ID OF START-POINT ROUTING APPARATUS | ID OF END-POINT ROUTING APPARATUS |
|---|---|
| Server2@relaysystem.net | Server3@relaysystem.net |

Fig. 9

PACKET FORWARDING CONTROL INFORMATION

| IDENTIFICATION INFORMATION OF ROUTING APPARATUS | ADDRESS FILTER INFORMATION ||
| --- | --- | --- |
| | IP ADDRESS OF ROUTING TARGET DEVICE | NAME OF ROUTING TARGET DEVICE |
| Client47@Server3.relaysystem.net | 192.168.45.100 | FILE SERVER 46 |
| Server2@relaysystem.net | 200.1.20.100 | COMMUNICATION DEVICE 22 (operator2) |

Fig. 15

OPERATOR GROUP INFORMATION

| NAME OF GROUP | CONFIGURATION OF GROUP |
|---|---|
| GROUP1 | Op1,Op2,Op3 |
| GROUP2 | Op3,Op4 |
| GROUP3 | Op2 |

Fig. 14

CONNECTION PERMISSION INFORMATION FOR EACH GROUP

| NAME OF GROUP | IDENTIFICATION INFORMATION OF CONNECTED-SIDE APPARATUS |
|---|---|
| GROUP1 | Server3@relaysystem.net |
| GROUP2 | Client42@Server3.relaysystem.net |
| GROUP3 | Client47@Server3.relaysystem.net |

Fig. 17

CONNECTION PERMISSION INFORMATION

| OPERATOR GROUP ID | OPERATOR ID | DESIGNATED RELAY SERVER ID |
|---|---|---|
| WorkGroup1 | Op1, Op2, Op3 | Server3@relaysystem.net |
| WorkGroup2 | Op2, Op4 | Server4@relaysystem.net |

Fig. 18

PACKET FORWARDING CONTROL INFORMATION

| IDENTIFICATION INFORMATION OF ROUTING APPARATUS | ADDRESS FILTER INFORMATION | |
|---|---|---|
| | IP ADDRESS OF ROUTING TARGET DEVICE | NAME OF ROUTING TARGET DEVICE |
| Server3@relaysystem.net | 192.168.30.10 | FILE SERVER 31 |
| Server2@relaysystem.net | 200.1.20.100 | COMMUNICATION DEVICE 22 (operator1) |

Fig. 19

OPERATOR CONNECTION CONTROL INFORMATION

| NAME | OPERATOR ID | DESIGNATED APPARATUS ID |
|---|---|---|
| SUB SYSTEM1 | Op1 | Server3@relaysystem.net |
| SUB SYSTEM2 | Op2 | Client47@Server3.relaysystem.net |
| SUB SYSTEM3 | Op3 | Server3@relaysystem.net,<br>Client42@Server3.relaysystem.net |

Fig. 27

PACKET FORWARDING CONTROL INFORMATION

| IDENTIFICATION INFORMATION OF ROUTING APPARATUS | ADDRESS FILTER INFORMATION | |
|---|---|---|
| | IP ADDRESS OF ROUTING TARGET DEVICE | NAME OF ROUTING TARGET DEVICE |
| Client47@Server3.relaysystem.net | 192.168.45.100 | FILE SERVER 46 |
| Server2@relaysystem.net | 200.1.20.100 | COMMUNICATION DEVICE 22 (operator2) |

Fig. 30

OPERATOR CONNECTION CONTROL INFORMATION

| NAME | OPERATOR ID | TIME ZONE | DESIGNATED APPARATUS ID |
|---|---|---|---|
| SUB SYSTEM1 | Op1 | 0:00-23:59 | Server3@relaysystem.net |
| SUB SYSTEM2 | Op2 | 0:00-23:59 | Client47@Server3.relaysystem.net |
|  |  | 0:00-6:00 | Client42@Server3.relaysystem.net |
| SUB SYSTEM3 | Op3 | 0:00-23:59 | Server3@relaysystem.net, Client42@Server3.relaysystem.net |

RELAY SERVER AND RELAY COMMUNICATION SYSTEM

BACKGROUND OF THE INVENTION

1. Field of the Invention

The present invention relates to a relay server that enables communication to be performed between terminals connected to different LANs (Local Area Networks).

2. Description of the Related Art

Conventionally, a communication technology called a virtual private network (Virtual Private Network, VPN) has been known (for example, see Japanese Patent Application Laid-Open No. 2002-217938). The VPN is used for, for example, performing communication via Internet between terminals that are connected to LANs of a plurality of branch offices (stations) each located in each of a plurality of different regions. Use of the VPN enables another LAN located in a distant place to be used as if it is a directly-connected network.

In this type of system, generally, communication between apparatuses is performed by using IP addresses and identification information of the apparatuses. However, an operator may not always use the same apparatus when performing operations in this type of system. The operator may use a different apparatus when he/she is in a different place or on a business trip, for example. This means that an apparatus included in a VPN is changed, which usually requires the VPN setting to be changed. In a case where, for example, setting of a network is changed, the change should be reflected in the other apparatuses. This complicates a process. Particularly, in a case where a number of operators perform operations in a large-scale network, setting of an access control tends to be complicated.

SUMMARY OF THE INVENTION

In view of the circumstances described above, preferred embodiments of the present invention provide a relay server that enables a VPN to be built with flexibility and mobility in accordance with an apparatus used by an operator.

In a first aspect of a preferred embodiment of the present invention, a relay server includes a storage unit that stores first address filter information and second address filter information, the first address filter information indicating an address to which the relay server is able to forward a packet, the second address filter information indicating an address to which a connecting-target apparatus that represents another relay server and a client terminal is able to forward a packet; an identification information receiver unit arranged to receive identification information of an operator who is performing a login operation via a communication apparatus connected to a LAN; a list obtainer unit arranged to obtain a list of the connecting-target apparatuses to which the operator is able to connect, based on the identification information of the operator whose login has been accepted; a selection receiver unit arranged to receive a selection of the connecting-target apparatus selected by the operator from the list of the connecting-target apparatuses to which the operator is able to connect; and a routing session establishment unit arranged to establish a routing session with the connecting-target apparatus selected by the operator. The relay server is configured to store, as the first address filter information, an address of the communication apparatus on which the operator has performed the login operation, and transmit the address of the communication apparatus to the connecting-target apparatus. The relay server is configured to store, as the second address filter information, an address received from the connecting-target apparatus. The relay server is configured to, in a case where a destination of a received packet is stored as the first address filter information, transmit the packet to the destination. The relay server is configured to, in a case where a destination of a received packet is stored as the second address filter information, transmit the packet to the routing session.

Accordingly, the operator is able to perform communication by using the routing session established between the relay server and the selected connecting-target apparatus. In the above-described configuration, the connecting-target apparatus to which an operator is able to connect is set for each operator. Therefore, even when the communication apparatus that the operator uses for logging in is changed, the operator is able to perform communication in a routing session established with the same partner as before, as long as the operator who logs in is the same as before. Additionally, it is easy to perform different access controls depending on operators.

In the relay server, it is preferable that the list obtainer unit that obtains the list of the connecting-target apparatuses is configured to obtain, as the list of the connecting-target apparatuses, a list of other relay servers to which an operator group where the operator whose login has been accepted belongs is able to connect.

Accordingly, the relay server that the operator can select as a partner of the routing session is set for each operator group to which the operator belongs, and an apparatus to which the operator is able to connect is designated in the selected relay server that is actually selected by the operator from selectable relay servers. Therefore, even when the communication apparatus that the operator uses for logging in is changed, the communication with the same apparatus as before can be performed as long as the operator who is logging in is not changed. Setting of the access control at the operator-group level is performed by the relay server itself, and setting of the access control at the operator level is performed by the selected relay server. This can reasonably and easily achieve a complicated access control.

In a second aspect of a preferred embodiment of the present invention, a relay server includes a packet forwarding control information storage unit and a control unit. The packet forwarding control information storage unit is configured to store address filter information in association with identification information of the relay server, the address filter information indicating an address of a routing target device that itself (relay server) is able to designate as a packet forwarding destination to which a packet is to be forwarded, and to store address filter information in association with identification information of a connecting-target apparatus, the address filter information indicating an address of a routing target device that the connecting-target apparatus is able to designate as a packet forwarding destination to which a packet is to be forwarded, the connecting-target apparatus being a connected-side relay server that is able to connect to the relay server and a client terminal belonging to the connected-side relay server. The control unit includes a connecting-target apparatus acquisition control unit, a VPN start control unit, an address filter information communication control unit, a routing session establishment control unit, and a routing control unit. The connecting-target apparatus acquisition control unit is configured and programmed to obtain the connecting-target apparatus to which an operator who has made a login request is able to connect, based on connection permission information that is information stored in itself (relay server) or another relay server to which the relay server is able to connect and that is information in which identification information of an operator who is able to log in to a relay communication system including the relay server and the connecting-target apparatus is associated with identification information of the connecting-target apparatus to which the operator is able to connect. The VPN start control unit is configured and programmed to perform a process to start a virtual private network on the connecting-target apparatus selected from the obtained connecting-target apparatuses. The address filter information communication control unit is configured to store, as address filter information associated with identification information of itself (relay server), an address of a communication apparatus that the operator has operated for making the login request, into the packet forwarding control information storage unit, and transmit the address filter information to the connecting-target apparatus, and store, as address filter information associated with identification information of the connecting-target apparatus, address filter information received from the connecting-target apparatus, into the packet forwarding control information storage unit. The routing session establishment control unit is configured and programmed to establish a routing session with respect to the selected connecting-target apparatus. The routing control unit is configured and programmed to perform a control for, in a case where a destination of a received packet is designated by the address filter information associated with the identification information of itself (relay server), transmitting the packet to the destination, and in a case where a destination of a received packet is designated by the address filter information associated with the identification information of the connecting-target apparatus, transmitting the packet to the connecting-target apparatus via the routing session established between itself (relay server) and the connecting-target apparatus.

Accordingly, using the built VPN enables communication to be performed between the communication apparatus that the operator has operated for making the login request and the routing target device to which the connecting-target apparatus is able to forward a packet. In the connection permission information, identification information of an operator is associated with identification information of the connecting-target apparatus to which the operator is able to connect. Therefore, even when the apparatus that the operator uses for logging in is changed, a VPN including the same partner as before can be easily and promptly built as long as the operator who is logging in is not changed. Additionally, it is easy to perform different access controls depending on operators.

Preferably, the relay server is configured as follows. The relay server includes a management-side information storage unit configured to store identification information of a relay server in a manager side that manages relay servers including itself (relay server). The connection permission information is stored in the relay server on the manager side. Upon reception of a login request from an operator, the control unit accesses the relay server on the manager side based on a content stored in the management-side information storage unit, to obtain the connecting-target apparatus to which the operator who has made the login request is able to connect.

Accordingly, the relay server on the manager side collectively manages the connection permission information. Therefore, it is not necessary that the connection permission information is shared among a plurality of apparatuses. This eliminates the need for a control for synchronizing the connection permission information among the apparatuses. Thus, a processing load in the relay server can be reduced.

Preferably, the relay server is configured as follows. The relay server includes a connection permission information storage unit configured to store the connection permission information. Upon reception of a login request from an operator, the control unit obtains the connecting-target apparatus to which the operator who has made the login request is able to connect, based on the connection permission information stored in the connection permission information storage unit.

In a case where the relay server on the manager side collectively manages the connection permission information as described above, it is necessary to access the relay server each time a login request is received from the operator. In this respect, in the above-described configuration, the connecting-target apparatus to which the operator who has made the login request is able to connect can be obtained merely by referring to the content stored in itself (relay server). This can simplify a process performed until the VPN is started.

Preferably, the relay server is configured as follows. The connection permission information is information in which information of an operator group including one or a plurality of operators is associated with a designated relay server that is designated as a relay server to which the operators belonging to the operator group are able to connect. The routing session establishment control unit is programmed to perform control to: establish a routing session between the relay server and a selected relay server that is a relay server selected by an operator from the designated relay servers; and establish a routing session between the selected relay server and a designated apparatus that is designated, from client terminals belonging to the selected relay server, as an apparatus to which the operator is able to connect, based on operator connection control information that is information stored in the selected relay server and that is information in which identification information of the operator belonging to the operator group is associated with identification information of the designated apparatus. The address filter information communication control unit exchanges the address filter information with the designated apparatus. The routing control unit is configured to perform control to, in a case where a destination of a received packet is designated by the address filter information associated with the identification information of the designated apparatus, transmit the packet to the designated apparatus via one or a plurality of routing sessions that connect the relay server and the designated apparatus to each other.

Accordingly, in the operator connection control information, the designated relay server or the designated apparatus to which connection is allowed is associated with the operator group or the operator (not with the apparatus that the operator has operated or used for logging in). In itself (relay server), the address filter information associated with itself is promptly prepared by using the address of the communication apparatus that the operator has operated for logging in to the relay communication system, and this address filter information associated with itself is used for packet forwarding. Therefore, even when the apparatus that the operator operates for logging in is changed, a VPN including the same partner as before can be easily built and used as long as the operator who is logging in is not changed. Moreover, in the above-described configuration, the access control at the relay-server level is performed on a basis of an operator group as a unit, while the access control at the apparatus level is performed on a basis of an individual operator as a unit based on the operator connection control information stored in each connected-side relay server (designated relay server). This achieves both simple setting and a delicate access control with respect to an operator's access control. Furthermore, in the operator connection control information stored in the designated relay server, the designated apparatus is stored (only) with respect to operators belonging to an operator group in which the designated relay server is the relay server itself. Thus, the operator connection control information that defines details of the access control at the apparatus level is divided into the designated relay servers, and is stored in the designated relay servers independently of one another. This can prevent enlargement of the content stored in each of the designated relay servers, and enables omission of a control to synchronize the contents stored therein.

Preferably, the relay server is configured as follows. In a case where the selected relay server is not able to communicate with the designated apparatus; based on an error notified from the selected relay server to itself (relay server), the control unit is programmed to cause a notification that connection has failed to be displayed on the communication apparatus operated by the operator who has made the login request.

This allows the operator who has logged in to properly recognize occurrence of an abnormal situation where a VPN communication cannot be started.

Preferably, the relay server is configured as follows. In the operator connection control information, the identification information of the operator belonging to the operator group is associated with the identification information of the designated apparatus and schedule information. The control unit is configured and programmed to, based on the operator connection control information, start a virtual private network using one or a plurality of routing sessions that connect the selected relay server and the designated apparatus corresponding to the operator who has made the login request and a current time to each other.

This achieves a mode delicate access control in consideration of a time zone in which the connection occurs.

In a third aspect of a preferred embodiment of the present invention, a relay communication system includes relay servers and client terminals belonging to the relay servers. Among the relay servers, the relay server functioning as a connecting-side relay server includes a packet forwarding control information storage unit and a control unit. The packet forwarding control information storage unit is configured to store address filter information in association with identification information of the relay server, the address filter information indicating an address of a routing target device that itself (relay server) is able to designate as a packet forwarding destination to which a packet is to be forwarded, and to store address filter information in association with identification information of a connecting-target apparatus, the address filter information indicating an address of a routing target device that the connecting-target apparatus is able to designate as a packet forwarding destination to which a packet is to be forwarded, the connecting-target apparatus being a connected-side relay server that is able to connect to the relay server and a client terminal belonging to the connected-side relay server. The control unit includes a connecting-target apparatus acquisition control unit, a VPN start control unit, an address filter information communication control unit, a routing session establishment control unit, and a routing control unit. The connecting-target apparatus acquisition control unit is configured and programmed to obtain the connecting-target apparatus to which an operator who has made a login request is able to connect, based on connection permission information that is information in which identification information of an operator is associated with identification information of the connecting-target apparatus to which the operator is able to connect when building a virtual private network. The VPN start control unit is configured and programmed to perform a process for starting a virtual private network on the connecting-target apparatus selected from the obtained connecting-target apparatuses. The address filter information communication control unit is configured and programmed to store, as address filter information associated with identification information of itself (relay server), an address of a communication apparatus that the operator has operated for making the login request, into the packet forwarding control information storage unit, and transmit the address filter information to the connecting-target apparatus, and store, as address filter information associated with identification information of the connecting-target apparatus, address filter information received from the connecting-target apparatus, into the packet forwarding control information storage unit. The routing session establishment control unit is configured and programmed to establish a routing session with respect to the selected connecting-target apparatus. The routing control unit is configured and programmed to, in a case where a destination of a received packet is designated by the address filter information associated with the identification information of itself (relay server), transmit the packet to the destination, and in a case where a destination of a received packet is designated by the address filter information associated with the identification information of the connecting-target apparatus, transmit the packet to the connecting-target apparatus via the routing session established between the relay server and the connecting-target apparatus.

Preferably, the relay communication system is configured as follows. The connection permission information is information in which information of an operator group including one or a plurality of operators is associated with a designated relay server that is designated as a relay server to which the operators belonging to the operator group are able to connect. The routing session establishment control unit is programmed to perform a control to: establish a routing session between the relay server and a selected relay server that is a relay server selected by an operator from the designated relay servers; and establish a routing session between the selected relay server and a designated apparatus that is designated, from client terminals belonging to the selected relay server, as an apparatus to which the operator is able to connect, based on operator connection control information that is information stored in the selected relay server and that is information in which identification information of the operator belonging to the operator group is associated with identification information of the designated apparatus. The address filter information communication control unit exchanges the address filter information with the designated apparatus. The routing control unit is configured and programmed to perform control to, in a case where a destination of a received packet is designated by the address filter information associated with the identification information of the designated apparatus, transmit the packet to the designated apparatus via one or a plurality of routing sessions that connect the relay server and the designated apparatus to each other.

This provides a relay communication system that achieves the above-described effects.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 5 is a diagram showing a content of operator information.

FIG. 6 is a diagram showing a content of connection permission information.

FIG. 8 is a diagram showing a content of routing session information.

FIG. 9 is a diagram showing a content of packet forwarding control information that is shared between the relay server 2 and a client terminal 47.

FIG. 14 is a diagram showing a content of operator group information.

FIG. 15 is a diagram showing a content of connection permission information according to the modification.

FIG. 17 is a diagram showing a content of connection permission information according to the second preferred embodiment of the present invention.

FIG. 18 is a diagram showing a content of packet forwarding control information according to the second preferred embodiment of the present invention.

FIG. 19 is a diagram showing a content of operator connection control information.

FIG. 27 is a diagram showing a content of the packet forwarding control information that is stored in the relay servers 2 and 3 in the case shown in FIG. 24.

FIG. 30 is a diagram showing a modification of the operator connection control information.

DETAILED DESCRIPTION OF THE PREFERRED EMBODIMENTS

Figure 1:
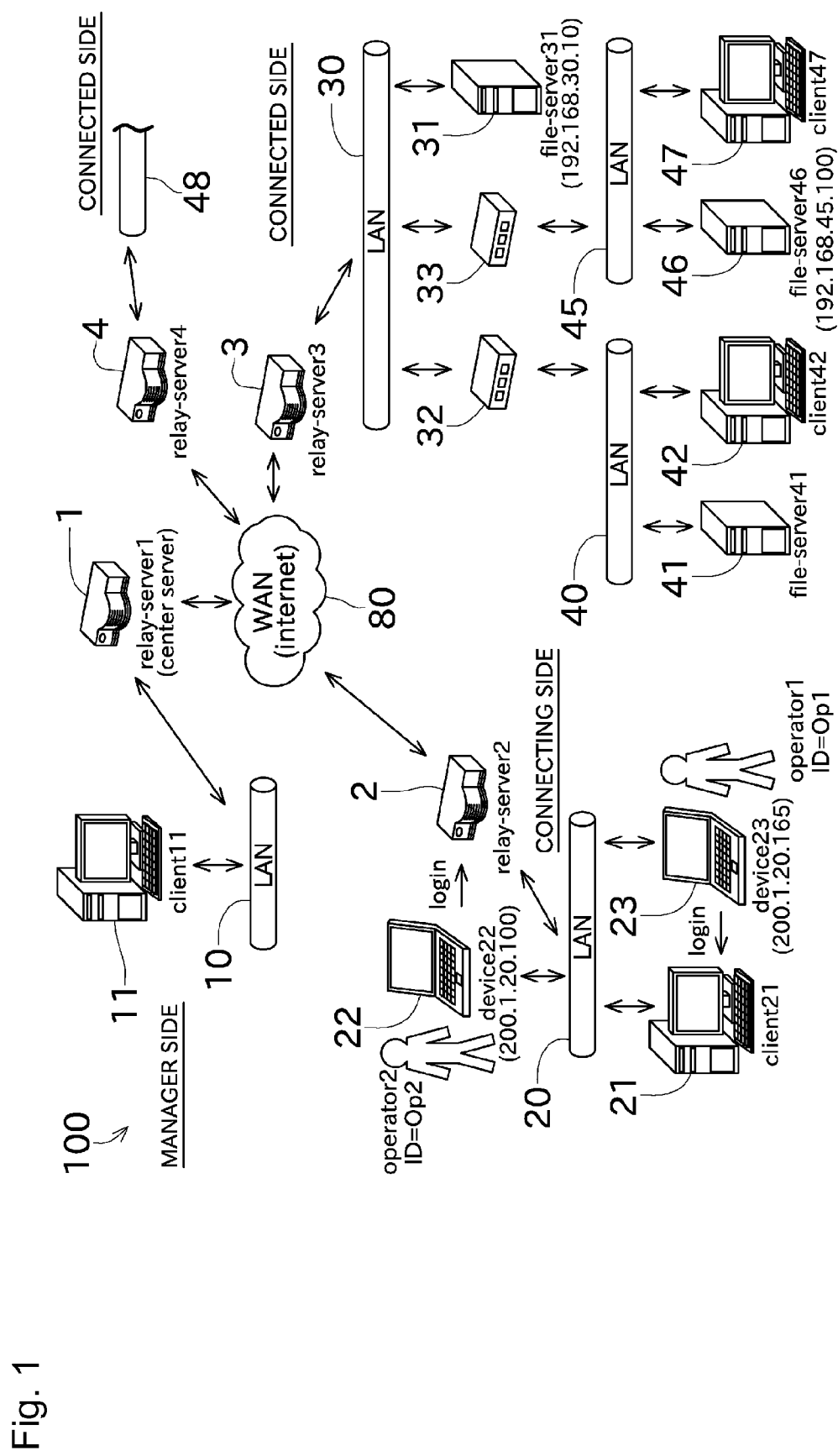
FIG. 1 is a diagram for explaining an overall configuration of a relay communication system according to a preferred embodiment of the present invention.

Next, preferred embodiments of the present invention will be described with reference to the drawings. Firstly, with reference to FIG. 1, an outline of a relay communication system 100 according to a first preferred embodiment of the present invention will be described. FIG. 1 is an explanatory diagram showing an overall configuration of a relay communication system 100 according to the first preferred embodiment of the present invention.

As shown in FIG. 1, the relay communication system 100 includes a plurality of relay servers 1, 2, 3, and 4 connected to a Wide Area Network (WAN; Wide Area Network) 80, and client terminals 11, 21, 42, 47 . . . that are connected to the relay servers 1, 2, 3, and 4 via LANs 10, 20, 30, 40, 45, and 48. The LANs 10, 20, 30, and 48 are at places that are physically distant from one another. In this preferred embodiment, the Internet is preferably used as the WAN 80.

In the following, a description will be given of each LAN. As shown in FIG. 1, the relay server 1 and the client terminal 11 are connected to the LAN 10. The relay server 2, the client terminal 21, the communication device 22, and a communication device 23 are connected to the LAN 20. The relay server 3 and a file server 31 are connected to the LAN 30. The relay server 4 is connected to the LAN 48.

The LAN 30 is connected with another LAN 40 via a router 32, and also connected with still another LAN 45 via a router 33. A file server 41 and the client terminal 42 are connected to the LAN 40. A file server 46 and the client terminal 47 are connected to the LAN 45.

Many client terminals, and the like, are arranged in the LANs 20 and 30, though only a portion of them is shown in FIG. 1. In the LAN 48 connected to the relay server 4, too, many client terminals, and the like, are arranged, though not shown.

For the operation of the relay communication system 100, an operator stands by in the place where the LAN 20 is installed. The file servers 31, 41, and 46, which are objectives of a maintenance operation, or the like, performed by the operator, are arranged in the LANs 30, 40, and 45. Apparatuses (not shown) that are objects of the maintenance operation are arranged in the LAN 48, too.

The place where the LAN 10 is installed is a station where the operator manages maintenance services. In the relay server 1, information that defines an access authority of the operator on a relay server basis is set (as connection permission information) in advance. The operator uses, for example, the communication devices 22, 23 to access the file server 31, 41, 46, or the like, within a range of the access authority given to the operator himself/herself, to thus perform remote maintenance.

In this manner, the relay communication system 100 of this preferred embodiment is configured such that connection is made from the LAN 20 side to the LANs 30, 40, 45, and 48 side so that various operations are performed. Connection in the reverse direction is not assumed. In the following description, therefore, the LAN 20 may be referred to as a "connecting side", and the LANs 30, 40, 45, and 48 may be referred to as a "connected side". Since various management operations of the relay communication system 100 are performed from an apparatus connected to the LAN 10, the LAN 10 may be referred to as "manager side" in the following description.

The relay server (relay server 2) connected to the LAN 20 in the connecting side may be referred to as a connecting-side relay server, and the relay server (relay server 3, 4) connected to the LAN 30, 48 in the connected side may be referred to as a connected-side relay server. The connecting-side relay server and the client terminals belonging to the relay server may be collectively referred to as connecting-side apparatuses. The connected-side relay server and the client terminals belonging to the relay server may be collectively referred to as connecting-target apparatuses.

Figure 2:
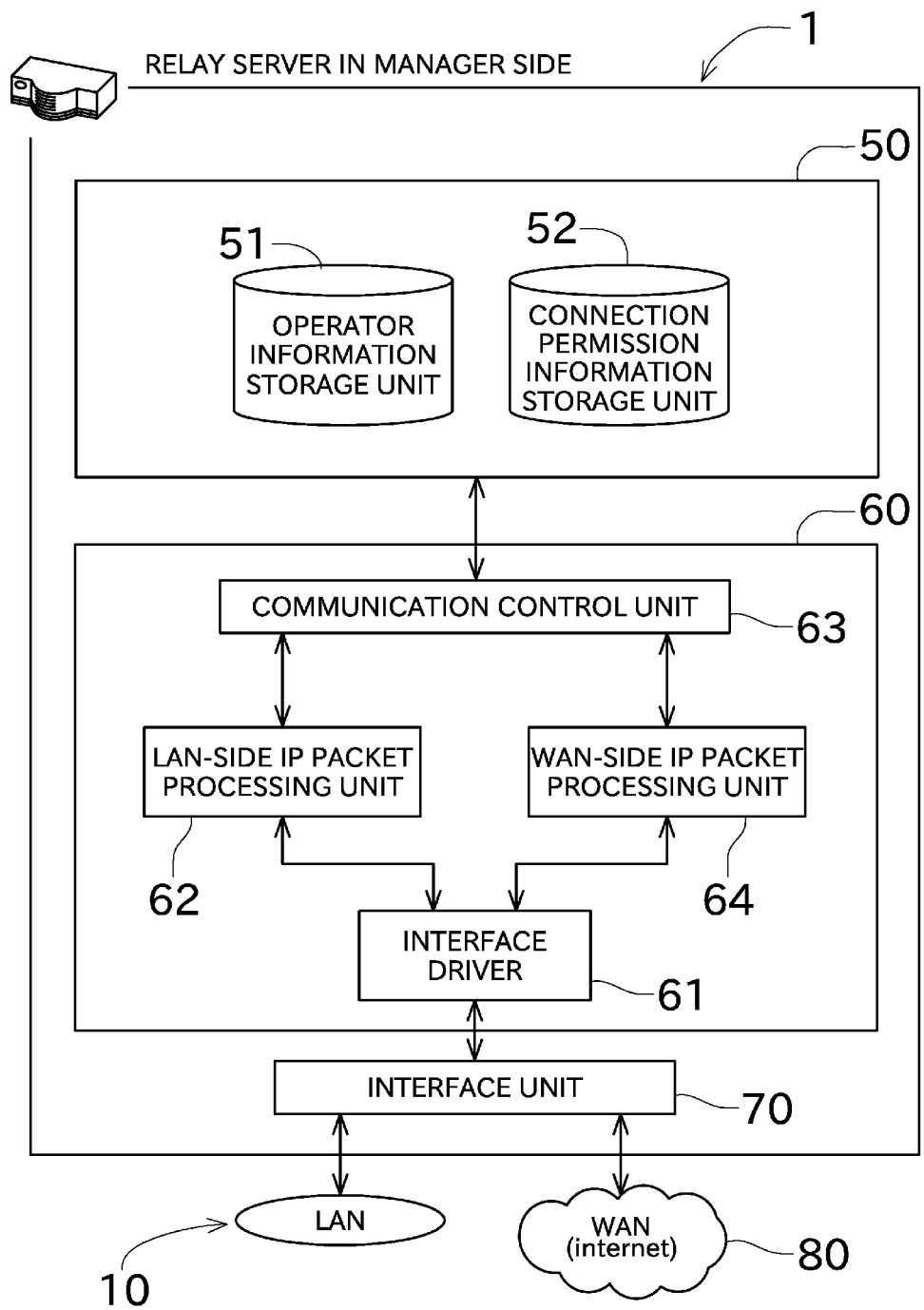
FIG. 2 is a functional block diagram of a relay server 1 on a manager side.
Figure 3:
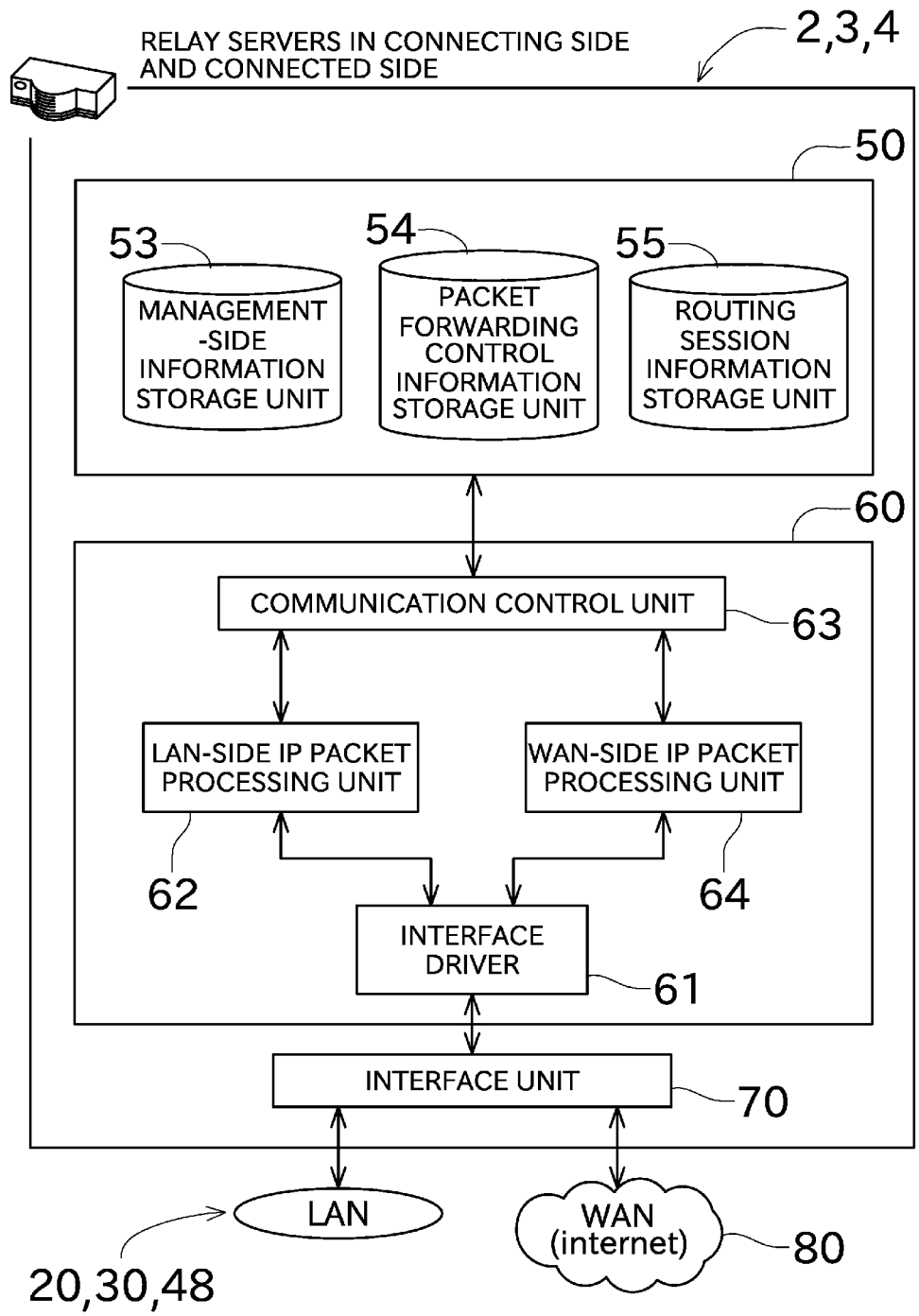
FIG. 3 is a functional block diagram of a relay server 2, 3, 4 that is an object to be managed.
Figure 4:
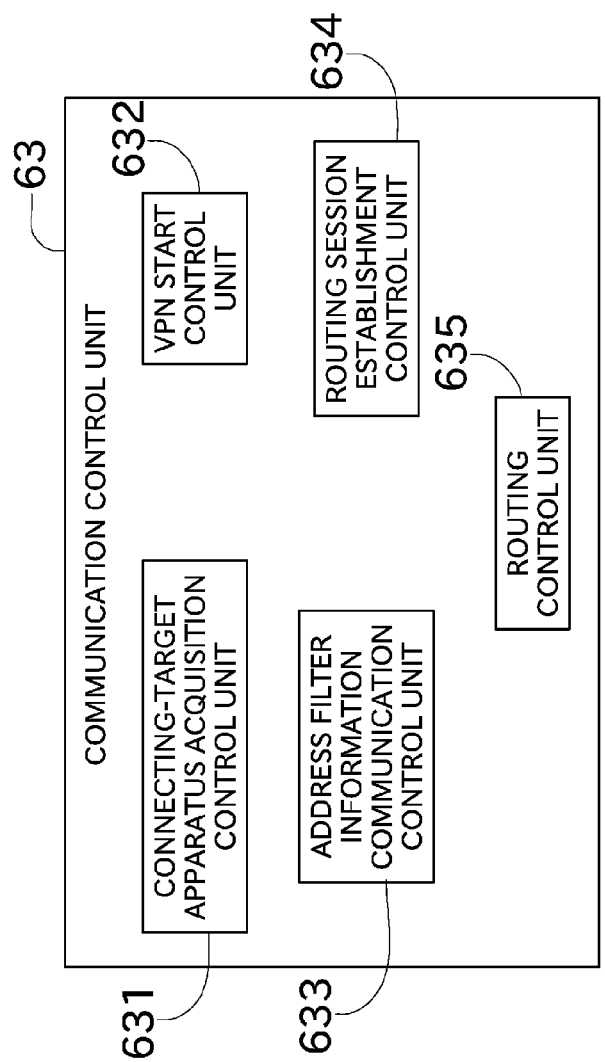
FIG. 4 is a functional block diagram showing a detailed configuration of a communication control unit 63 of a relay server.

Next, the relay servers 1 to 4 will be described with reference to FIGS. 2 to 9. FIG. 2 is a function block diagram of the relay server 1 on the manager side. FIG. 3 is a function block diagram of the relay servers 2, 3, and 4 on the connecting side and on the connected side. FIG. 4 is a function block diagram showing a detailed configuration of a communication control unit 63 of the connecting-side relay server. FIGS. 5 to 9 are diagrams showing contents stored in the relay server.

As shown in FIG. 1, each of the relay servers 1 to 4 is connected not only to each of the LANs 10, 20, 30, 48 but also to the WAN 80. Not only a private IP address but also a global IP address is given to each of the relay servers 1, 2, 3, and 4. Therefore, each of the relay servers 1 to 4 is able to communicate not only with the client terminal connected to the same LAN as the LAN to which the relay server itself is connected but also with the relay servers arranged in the other LANs.

The relay communication system 100 of this preferred embodiment is configured such that one of the relay servers included in the system operates as the relay server on the manager side while each of the other relay servers operates as either of the connecting side or the connected side. More specifically, in this preferred embodiment, setting is performed in advance such that the relay server 1 operates as the relay server on the manager side, the relay server 2 operates as the connecting-side relay server, and the relay servers 3 and 4 operate as the connected-side relay servers. In the following, the relay server 1 on the manager side, the connecting-side relay server 2, and the connected-side relay servers 3, 4 will be described in the mentioned order.

As shown in FIG. 2, the relay server 1 on the manager side includes a storage unit 50, a control unit 60, and an interface unit 70.

The interface unit 70 is able to communicate with a terminal within the LAN 10 by using the private IP address. The interface unit 70 is also capable of communication through the WAN 80 by using the global IP address.

The control unit 60 is, for example, a CPU with control and computation functions, and able to execute various kinds of processing based on a program read out from the storage unit 50. The control unit 60 is able to control various kinds of communication in accordance with a protocol such as TCP/IP, UDP, or SIP. As shown in FIG. 2, the control unit 60 includes an interface driver 61, a LAN-side IP packet processing unit 62, a communication control unit 63, and a WAN-side IP packet processing unit 64.

The interface driver 61 is driver software used to control the interface unit 70. The LAN-side IP packet processing unit 62 performs an appropriate process on a packet received from the LAN 10, and outputs a result to the communication control unit 63. The WAN-side IP packet processing unit 64 performs an appropriate process on a packet received from the WAN 80, and outputs a result to the communication control unit 63.

The communication control unit 63 determines a destination of the received packet based on information indicated by the packet and information stored in the storage unit 50, and transmits the packet to the determined destination. The communication control unit 63 is able to update a content stored in the storage unit 50 based on information received from another terminal. As shown in FIG. 4, the communication control unit 63 includes a connecting-target apparatus acquisition control unit 631, a VPN start control unit 632, an address filter information communication control unit 633, a routing session establishment control unit 634, and a routing control unit 635. Controls performed by these control units will be described later.

The storage unit 50 is, for example, configured as a hard disk or a non-volatile RAM, and able to store various types of data. The storage unit 50 includes an operator information storage unit 51 and a connection permission information storage unit 52. Hereinafter, a content stored in the storage unit 50 will be described with reference to FIGS. 5 and 6. FIG. 5 is a diagram showing a content of operator information. FIG. 6 is a diagram showing a content of connection permission information.

The operator information storage unit 51 included in the relay server 1 stores operator information that is information for identifying an operator who is able to log into the relay communication system 100 and that is information indicating a use status of the operator, or the like. The operator information storage unit 51 is provided only in the relay server 1 on the manager side. As shown in FIG. 3, the relay servers 2 and 3 do not include the operator information storage unit 51. In the following, a specific description will be given to the content of the operator information.

In the operator information shown in FIG. 5, the column "operator ID" describes a list of operator IDs that are able to log in to the relay communication system 100. The operator ID is a character string uniquely set for each operator. The column "passcode" describes passcodes, each of which is necessary for logging in to the relay communication system 100 with use of the operator ID described in the corresponding row. Each operator is able to log in to the relay communication system 100 by using the operator ID and the passcode that are set to himself/herself.

A flow in which the operator logs in to the relay communication system 100 by using the operator ID and the passcode will be briefly described. The operator accesses the relay server 2 or the client terminal 21 via the communication device 22, 23, or the like, and inputs the operator ID and the passcode on a predetermined login screen. Thus, the operator is able to request a login to the relay communication system 100. The relay server 2 or the client terminal 21 receives this login request, and then transmits a content of the input to the relay server 1. The relay server 1 receives the content of the input, and then checks the operator ID and the passcode inputted by the operator against the operator information stored in the operator information storage unit 51. Additionally, the relay server 1 determines whether or not this operator ID has already logged in via another relay server. Based on a result thereof, the relay server 1 determines whether or not to permit the login.

FIG. 5 illustrates an example of the operator information stored in the operator information storage unit 51 of the relay server 1. In the operator information storage unit 51, the column "used apparatus information" describes information (used apparatus information) concerning an apparatus (which, more specifically, is the relay server 2 or the client terminal 21, not the communication device 22 or 23; hereinafter referred to as a used apparatus) in the relay communication system 100 side that is used for the operator to log in to the relay communication system 100 in a case where the operator has already logged in to the relay communication system 100 by using the operator ID described in the corresponding row.

To be specific, in a case where the operator is logging in by using a relay server, identification information of the relay server serves as the used apparatus information. For example, in a case where an operator2 shown in FIG. 1 logs in to the relay server 2 via the communication device 22; in the operator information storage unit 51 of the relay server 1, the identification information of the relay server 2 is described as the used apparatus information associated with the operator ID (Op2) of the operator2, as shown in FIG. 5.

In a case where the operator is logging in by using a client terminal, both identification information of the client terminal and identification information of a relay server to which the client terminal belongs serve as the used apparatus information. For example, in a case where an operator 1 shown in FIG. 1 logs in to the client terminal 21 via the communication device 23; in the operator information storage unit 51 of the relay server 1, the identification information of the client terminal 21 and the identification information of the relay server 2 are described as the used apparatus information associated with the operator ID (Op1) of the operator 1, as shown in FIG. 5.

In a case where the operator is not logging in to the relay communication system 100, the used apparatus information is blank. (see the used apparatus information associated with Op3 and Op4 in FIG. 5).

Among the operator information stored in the operator information storage unit 51, the list of the operator IDs capable of logging in, and the passcode set for each of the operator IDs, are set in advance by an operator, a manager, or the like. Each time an operator logs in or logs out, the used apparatus information is updated into the latest information.

The connection permission information storage unit 52 stores connection permission information that indicates an access authority given to the operator who is able to log in to the relay communication system 100. In this preferred embodiment, the connection permission information storage unit 52 is provided only in the relay server 1 on the manager side. As shown in FIG. 3, the relay servers 2 and 3 do not include the connection permission information storage unit 52. In the following, a specific description will be given to the content of the connection permission information.

In the connection permission information shown in FIG. 6, the column "operator ID" describes a list of operator IDs that are able to log in to the relay communication system 100. The column "identification information of connected-side apparatus" describes identification information of the connecting-target apparatus to which connection is permitted with use of the operator ID described in the corresponding row. More specifically, when the operator2 (operator ID=Op2) operates the communication device 22 to thus access the relay server 2, and logs in to the relay communication system 100 via the relay server 2; the operator2 is able to use connection between the relay server 2 (used apparatus) and the connecting-target apparatus (to be specific, the client terminal 42 or the client terminal 47) associated with the operator2 in the connection permission information shown in FIG. 6. In this case, a routing session is established that starts at the relay server 2 (used apparatus) as a start point, routes through the relay server 3, and ends at the client terminal 42 or the client terminal 47 as an end point. Additionally, a virtual private network (VPN) using this routing session is built.

In the connection permission information (FIG. 6) stored in the connection permission information storage unit 52, the connecting-target apparatus is associated with the operator ID (not with the identification information of the used apparatus). Accordingly, even when the operator2 logs in by using a different apparatus, the connecting-target apparatus to which connection is permitted is the same as that described above. For example, if the operator2 operates the communication device 23 to access the client terminal 21, and logs in to the relay communication system 100 via the client terminal 21; a routing session is established that starts at the client terminal 21 (used apparatus) as a start point, routes through the relay server 2 and the relay server 3, and ends at the client terminal 42 or the client terminal 47 as an end point, and additionally a VPN using the routing session is built.

Next, configurations of the relay server 2 to 4 will be described with reference to FIG. 3 and FIGS. 7 to 9. The relay servers 2 to 4 preferably have substantially the same configuration except for a portion thereof, and therefore the relay server 2 will be described as a typical example.

The relay server 2 includes the control unit 60 and the interface unit 70 having the same configurations as those of the relay server 1. The storage unit 50 of the relay server 2 is different from the storage unit 50 of the relay server 1 in terms of a storage content. To be specific, the relay server 2 includes, in the storage unit 50, a management-side information storage unit 53, a packet forwarding control information storage unit (address filter information storage unit) 54, and a routing session information storage unit 55.

Figure 7:
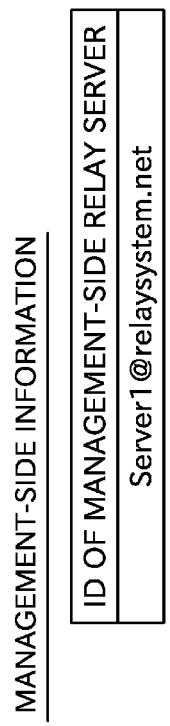
FIG. 7 is a diagram showing a content of management-side information.

As shown in FIG. 7, the management-side information storage unit 53 stores the identification information of the relay server 1 that is the relay server on the manager side whose management target is the relay server 2 itself. Accordingly, by referring to the content stored in the management-side information storage unit 53, the relay server 2 is able to access the relay server 1 that is the relay server on the manager side. In a case where the relay server on the manager side is changed because of maintenance or the like, it is notified to the relay server so that the content stored in the management-side information storage unit 53 is updated.

In a case where the relay server 2 cooperates with another apparatus to make the routing session for packet forwarding, the routing session information storage unit 55 stores routing session information in which the identification information of the relay server 2 itself is associated with the identification information of the apparatus with which the relay server 2 cooperates to make the routing session. In the following description, an apparatus that cooperates with another apparatus to make a routing session and forwards a packet may be referred to as a routing apparatus.

FIG. 8 shows a content stored in the routing session information storage unit 55 in a case where the relay server 2 and the relay server 3 make a routing session. In the routing session information, apparatuses that cooperate with each other to make the routing session are classified into the side (start point) that takes initiative to perform a communication control and the side (endpoint) that receives the communication control in the routing session establishment process.

In a case where a connecting-side apparatus and a connected-side apparatus establish a routing session, the connecting-side apparatuses takes initiative to perform the communication control without fail. In a case where a connected-side relay server and a client terminal belonging to the connected-side relay server establish a routing session, the relay server takes initiative to perform the communication control without fail. Since an apparatus that should serve as a start point of the communication control is defined based on a unified rule, collision of the communication control can be prevented.

The packet forwarding control information storage unit 54 stores packet forwarding control information that indicates a packet destination that makes the relay server 2 forward this packet, in a case where the relay server 2 cooperates with another apparatus to make a routing session as a result of an operator logging in to the relay server 2 and a VPN using this routing session is built.

In this preferred embodiment, the relay server can function as a routing apparatus, and the client terminal can function as a routing apparatus.

FIG. 9 shows an example of an outline of a content stored in the packet forwarding control information storage unit 54. In FIG. 9, the right column "address filter information" shows a packet destination to which forwarding is permitted. The packet forwarding control information includes a combination of a plurality of pieces of address filter information, as shown in FIG. 9.

In this preferred embodiment, the address filter information is information in which an address of an apparatus (a routing target device for a packet) is associated with a name given to the apparatus. In an example shown in FIG. 9, the address of the address filter information is described as if it indicates a single apparatus. Instead, an address that indicates the entire network by using, for example, a netmask is also adoptable. The name associated with the address may be an appropriate comprehensible name such as the name of an apparatus (or a network) indicated by the address or the name of an operator who is using the apparatus.

A description will be given based on the example shown in FIG. 9. When the destination of a packet received by the relay server 2 is the file server 46 or the operator2 (to be exact, the communication device 22 operated by the operator2), the relay server 2 forwards the packet to another apparatus. In this case, as a forwarding destination, two types of destination are conceivable. One is another routing apparatus with which the relay server 2 cooperates to make the routing session, and the other is the destination of the packet. When the destination of a packet is neither of the apparatuses, the relay server 2 does not forward the packet.

The packet forwarding control information and the address filter information included in the packet forwarding control information are used to determine whether or not to permit forwarding of a packet based on the destination of the packet (for filtering a packet).

In the following, the address filter information associated with the relay server 2 may be referred to as first address filter information, and the address filter information associated with another apparatus may be referred to as second address filter information.

The relay servers 2 to 4 are configured as described above. The client terminals 11, 21, 42, and 47 include storage unit 50 and control unit 60 having substantially the same configurations as those of the relay server 2, though a detailed description of the configurations of the client terminals 11, 21, 42, and 47 is omitted. Particularly, the client terminal includes a packet forwarding control information storage unit configured to store the same content as the content stored in the packet forwarding control information storage unit 54 of the relay server 2, 3. Each client terminal includes a belonging relay server information storage unit configured to store identification information of a relay server to which the client terminal itself belongs.

Next, a description will be given to a process for preparing the packet forwarding control information as shown in FIG. 9 in each of the routing apparatuses (the relay server and the client terminal). As described above, the packet forwarding control information sets the rule of the packet forwarding control that the routing apparatus performs to achieve a VPN. In the relay communication system 100 of this preferred embodiment, a plurality of VPNs made up of different sets of apparatuses can be built. To achieve such a relay communication system 100, the packet forwarding control information storage unit of the relay server and the client terminal are configured to store the packet forwarding control information for each VPN. That is, each time a new VPN is built, new packet forwarding control information is prepared, and stored in the packet forwarding control information storage unit of the routing apparatus.

The routing session for the VPN is made between the used apparatus that the operator has logged in and the connecting-target apparatus that the operator has designated when instructing the preparation of the VPN. Thus, for preparing the VPN, the packet forwarding control information as shown in FIG. 9 is prepared and stored in the packet forwarding control information storage unit in each of the used apparatus and the connecting-target apparatus functioning as the routing apparatuses.

Accordingly, when the VPN is built, the relay server or the client terminal functioning as the routing apparatus is allowed to transmit the address filter information associated with itself to the partner routing apparatus. Exchange of the address filter information allows each of the routing apparatuses to combine the address filter information associated with itself with the address filter information associated with another routing apparatus to thereby prepare the packet forwarding control information as shown in FIG. 9, and then store the packet forwarding control information in the packet forwarding control information storage unit of itself.

At this time, the address filter information associated with itself varies depending on whether the routing apparatus itself is the used apparatus or the connecting-target apparatus. To be specific, each of the relay server and the client terminal that may potentially function as the routing apparatus stores, in its packet forwarding control information storage unit, at least the address filter information (which, hereinafter, may be also referred to as pre-set address filter information) that is set in advance so as to indicate an apparatus to which the routing apparatus itself is able to directly transmit a packet. In a case where the relay server or the client terminal is designated as the connecting-target apparatus and thus functions as the routing apparatus; at a time of building the VPN, the relay server or the client terminal adopts the pre-set address filter information as the address filter information associated with itself.

In a case where the relay server or the client terminal functions as the routing apparatus as a result of the relay server or the client terminal being adopted as the used apparatus (as a result of the operator logging in via the relay server or the client terminal); at a time of building the VPN, the relay server or the client terminal adopts, as the address filter information associated with itself, not the pre-set address filter information but the address of an apparatus that is directly operated by the operator for logging in to the relay server or the client terminal.

It may be acceptable that the relay server 2 and the client terminal 21 arranged in the connecting side do not include any configuration to store the pre-set address filter information in advance. The reason therefor is that, in the connected side, the apparatus that may be possibly subjected to the maintenance operation rarely changes, while in the connecting side, the communication apparatus that the operator operates for the maintenance frequently changes depending on the situation, and therefore setting its address in advance is not practical.

Figure 10:
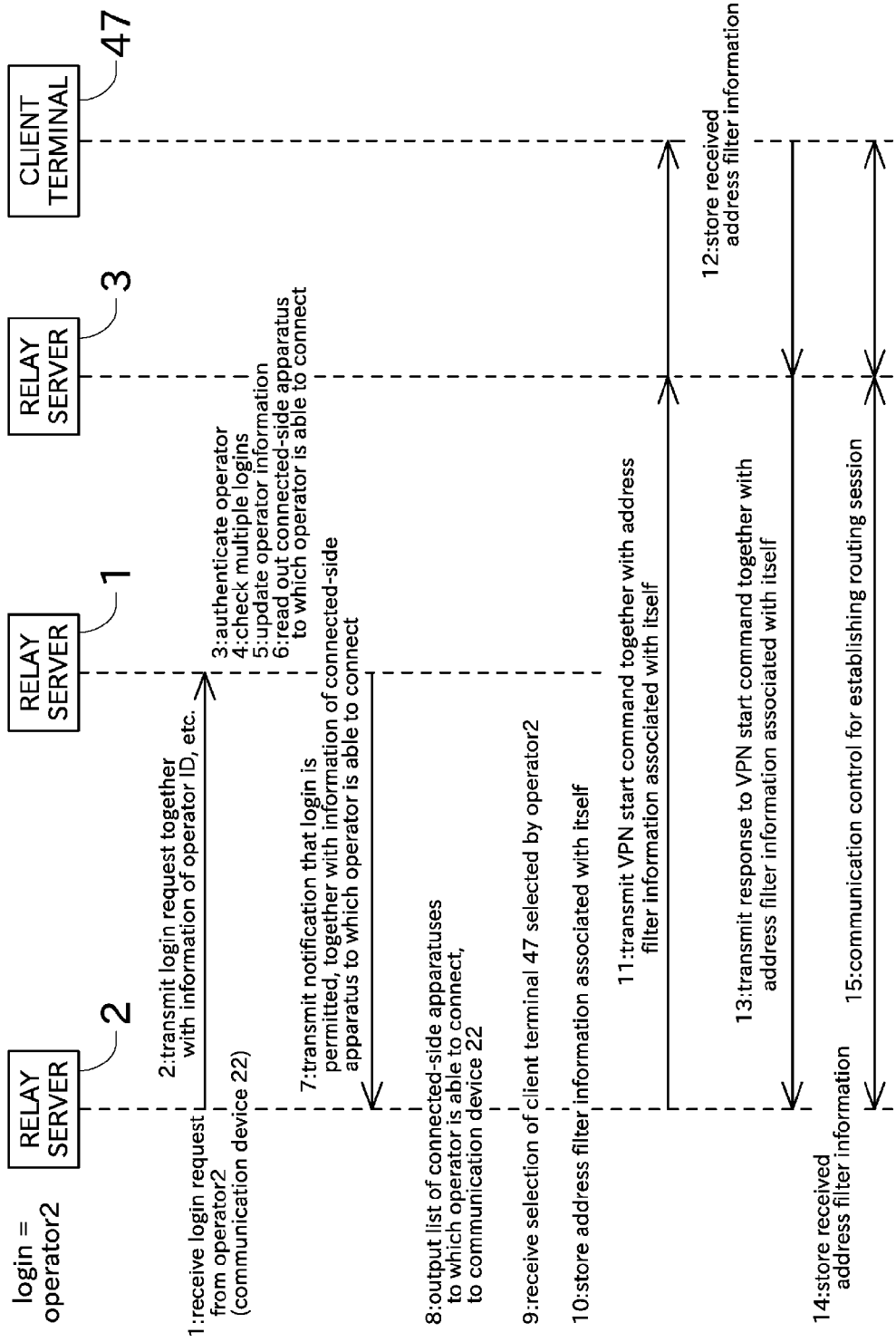
FIG. 10 is a sequence diagram showing a flow of a process for starting a VPN in a preferred embodiment of the present invention.

Next, a specific flow in which the operator2 logs in to the relay communication system 100 and build a VPN will be described mainly with reference to FIG. 10. FIG. 10 is a sequence diagram showing a flow of a process for starting a VPN according to a preferred embodiment of the present invention.

As described above, the operator2 performs an appropriate operation on the communication device 22 to thus access the relay server 2, and requests a login with the relay server 2 serving as the used apparatus. In the login request, an input of the operator ID and the passcode is requested. Then, the operator2 inputs the operator ID (Op2) and the passcode (def) of himself/herself, and enters a content thus inputted. Thus, the relay server 2 receives the login request (Sequence Number 1). The relay server 2 includes an identification information receiver unit to receive the identification information of the operator who performs a login operation. The relay server 2 transmits, to the relay server 1, the login request together with the operator ID, the passcode, and used apparatus information (specifically, the identification information of the relay server 2) that are inputted (Sequence Number 2).

The relay server 1 receives the login request, and the like, and authenticates the operator ID and the passcode based on the operator information shown in FIG. 5 (Sequence Number 3). To prevent multiple logins by using the same operator ID, the relay server 1 determines whether or not any other login is being made by using the inputted operator ID (Sequence Number 4). In a case where the operator is successfully authenticated and no multiple logins are made, the relay server 1 permits the login and updates the operator information stored in the operator information storage unit 51 (Sequence Number 5). More specifically, the identification information of the relay server 2 is stored as the used apparatus information associated with the Op2.

The relay server 1 refers to the connection permission information stored in the connection permission information storage unit 52, to readout a list of connecting-target apparatuses to which the operator2 who has been permitted to log in is able to connect (Sequence Number 6). In this example, in the connection permission information shown in FIG. 6, the client terminals 42 and 47 are associated with the operator2. Therefore, the relay server 1 transmits, to the relay server 2, the identification information of the client terminals 42 and 47 together with a notification that the login is permitted (Sequence Number 7).

Based on this notification, the connecting-target apparatus acquisition control unit 631 of the relay server 2 is able to obtain the connecting-target apparatuses (the client terminals 42 and 47) to which the operator2 is able to connect. Thus, the relay server includes a list obtainer unit arranged to obtain a list of connecting-target apparatuses to which the operator is able to connect. The relay server 2 displays, on the communication device 22, the connecting-target apparatuses to which the operator2 is able to connect together with the notification that the login is permitted (Sequence Number 8). Here, it is assumed that the operator2 selects, from the client terminals 42 and 47, the client terminal 47 as an target that functions as the routing apparatus (connecting-target apparatus). The relay server 2 includes a selection receiver unit arranged to receive an operator's selection. Upon reception of the operator's selection (Sequence Number 9), the relay server 2 associates the IP address of the communication device 22 that the operator2 has directly operated in requesting the login, with the identification information of the relay server 2, and stores them as the first address filter information into the packet forwarding control information storage unit 54 (Sequence Number 10). More specifically, information described in the lower section of the table shown in FIG. 9 is stored in the packet forwarding control information storage unit 54. Then, the VPN start control unit 632 of the relay server 2 transmits a VPN start command to the client terminal 47 via the relay server 3, and the address filter information communication control unit 633 transmits the address filter information (first address filter information) stored in association with the identification information of the relay server 2 itself, to the client terminal 47 via the relay server 3 (Sequence Number 11).

The client terminal 47 receives the start command, and stores the received address filter information into the packet forwarding control information storage unit (Sequence Number 12). Here, as described above, in the packet forwarding control information storage unit of the client terminal 47, the address filter information that designates the file server 46 is stored in advance (as the pre-set address filter information) in association with the identification information of itself (client terminal 47). As a result, as shown in FIG. 9, the packet forwarding control information including two pieces of address filter information is stored in the packet forwarding control information storage unit of the client terminal 47. The client terminal 47 transmits the address filter information associated with itself (information in the upper section of a table shown in FIG. 9) together with a notification that a signal is received, to the relay server 2 via the relay server 3 (Sequence Number 13).

Upon reception of a response from the client terminal 47, the relay server 2 stores the received address filter information as the second address filter information into the packet forwarding control information storage unit 54 (Sequence Number 14). As a result, in the packet forwarding control information storage unit 54 of the relay server 2, too, the packet forwarding control information including two pieces of address filter information is stored as shown in FIG. 9. In the above-described manner, exchange of the address filter information between the relay server 2 and the client terminal 47 is completed. After the exchange of the address filter information, both the packet forwarding control information storage unit 54 of the relay server 2 and the packet forwarding control information storage unit of the client terminal 47 store the content shown in FIG. 9.

The relay server 2 includes a routing session establishment control unit 634 that is configured and programmed to establish a routing session, and performs a communication control on the client terminal 47 via the relay server 3, to establish a routing session with the client terminal 47 (Sequence Number 15). As a result, a routing session is established that starts at the relay server 2 as a start point, routes through the relay server 3, and ends at the client terminal 47 as an end point.

Although the process to establish a routing session between the relay server 2 serving as the used apparatus and the client terminal 47 serving as the connecting-target apparatus has been described above, it is possible that the routing session is established among another combination of apparatuses. For example, a case where the operator1 accesses the client terminal 21 from the communication device 23 and logs in to the relay communication system 100 by using the client terminal 21 as the used apparatus, will be considered. As shown in FIG. 6, the operator1 is permitted to connect to the relay server 3. Therefore, in this case, a routing session can be established that starts at the client terminal 21 as a start point, routes through the relay server 2, and ends at the relay server 3 as an end point. At this time, in the packet forwarding control information storage units of the routing apparatuses (the client terminal 21 and the relay server 3), the address of the communication device 23 is stored as the address filter information in association with the identification information of the client terminal 21.

Figure 11:
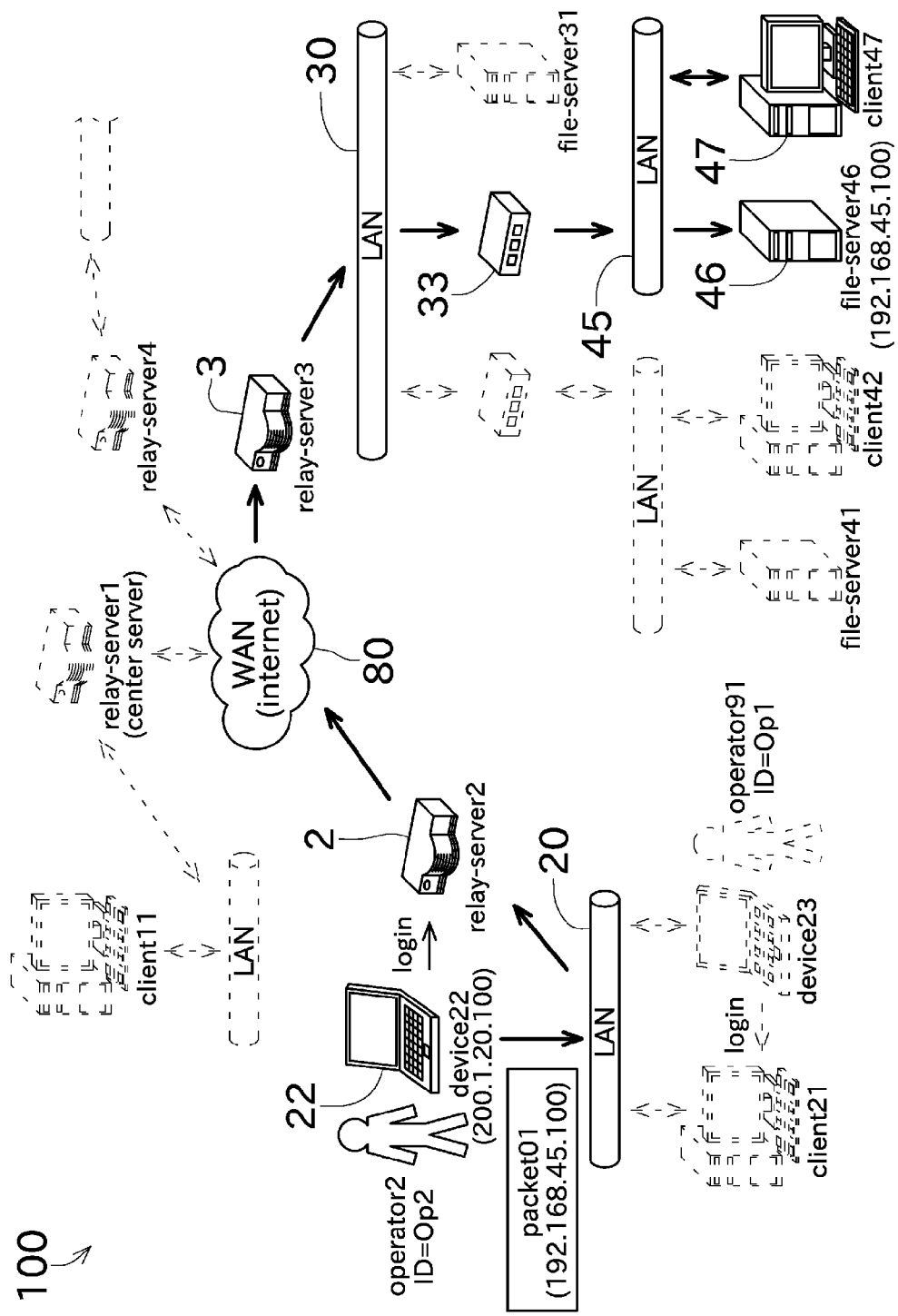
FIG. 11 is a diagram for explaining a path through which a communication device 22 transmits a packet to a file server 46.
Figure 12:
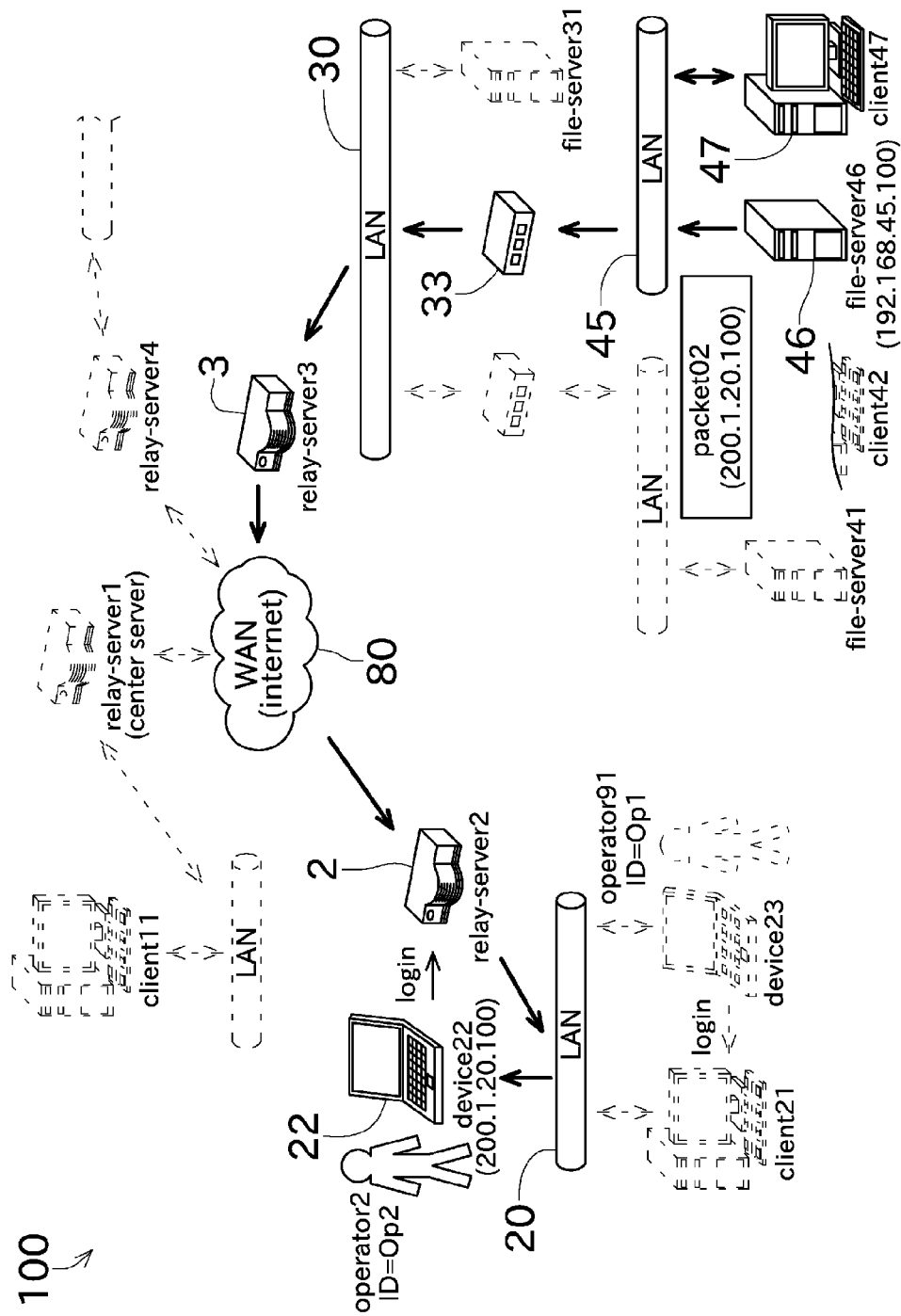
FIG. 12 is a diagram for explaining a path through which the file server 46 transmits a packet to the communication device 22.

Next, a routing control that the routing control unit 635 of the relay server 2 performs by using the established routing session will be described. FIG. 11 is a diagram for explaining a path through which the communication device 22 transmits a packet to the file server 46. FIG. 12 is a diagram for explaining a path through which the file server 46 transmits a packet to the communication device 22.

Firstly, a process performed when the relay server 2 receives a first packet (packet01) shown in FIG. 11 will be described. The first packet is transmitted by the communication device 22, and the IP address (192.168.45.100) of the file server 46 is designated as a destination address of the first packet.

The relay server 2 receives the first packet, and then compares the content stored in the packet forwarding control information storage unit 54 (FIG. 9) against the destination address of the first packet. The relay server 2 searches for a routing apparatus that is able to directly transmit a packet to the destination indicated in the first packet. As shown in FIG. 9, the destination address (192.168.45.100) of the first packet is stored as the address filter information (second address filter information) associated with the client terminal 47. Accordingly, the relay server 2 permits forwarding of the first packet, and transmits the first packet to the relay server 3 with the client terminal 47 being set as the final destination via the routing session established between the relay server 2 and the client terminal 47.

The client terminal 47 receives the first packet, and similarly to the relay server 2, compares the content stored in the packet forwarding control information storage unit (FIG. 9) against the destination address of the first packet. As a result, since the destination (192.168.45.100) indicated in the first packet is stored as the first address filter information, the client terminal 47 detects that the client terminal 47 itself is able to directly transmit the packet. Accordingly, the client terminal 47 permits forwarding of the first packet, and transmits the first packet to the file server 46.

Next, a process performed when the client terminal 47 receives a second packet (packet02) shown in FIG. 12 will be described. The second packet is transmitted by the file server 46, and the IP address (200.1.20.100) of the communication device 22 is designated as the destination address of the second packet.

After receiving the second packet, the client terminal 47 performs the same process as described above, and detects that the destination address (200.1.20.100) of the second packet is designated by the address filter information associated with the relay server 2. Therefore, the client terminal 47 permits forwarding of the second packet, and transmits the second packet to the relay server 3 with the relay server 2 being set as the final destination via the routing session established between the client terminal 47 and the relay server 2.

The relay server 2 receives the second packet, and performs the same process as described above, to detect that the destination address (200.1.20.100) of the second packet is designated by the address filter information associated with itself (relay server 2). Therefore, the relay server 2 permits forwarding of the second packet, and transmits the second packet to the communication device 22.

Thus, in this preferred embodiment, routing target data is fed through a routing session at an application layer. Therefore, the above-described routing is different from an ordinary IP routing.

Routing at the application layer allows LANs in distant places to communicate with each other by using the private IP addresses without regard to a WAN. Moreover, as described above, the routing apparatus is able to display the name of the routing target device that can be designated as the forwarding destination to which a packet should be forwarded. This enables the user to easily recognize an apparatus to which the packet can be transmitted by using the VPN.

As thus far described, the relay server 2 of this preferred embodiment includes a packet forwarding control information storage unit 54 arranged to store the first address filter information and the second address filter information. The first address filter information indicates an address to which the relay server 2 itself is able to forward a packet. The second address filter information indicates an address to which the client terminal 47 that is another connecting-target apparatus is able to forward a packet. The relay server 2 includes an identification information receiver unit arranged to receive the identification information of the operator2 who is performing a login operation via the communication device 22 connected to the LAN 20; a list obtainment unit arranged to obtain a list of connecting-target apparatuses to which the operator2 is able to connect, based on the identification information (Op2) of the operator2 whose login has been received; a selection receiver unit arranged to receive a selection of the connecting-target apparatus (client terminal 47) selected by the operator2 from the list of the connectable connecting-target apparatuses; and a routing session establishment control unit 634 that establishes a routing session with the client terminal 47 selected by the operator2. The relay server 2 stores, as the first address filter information, the address of the communication device 22 on which the operator2 has performed the login operation, and transmits the address of the communication device 22 to the client terminal 47. The relay server 2 stores, as the second address filter information, the address of the file server 46 received from the client terminal 47. In a case where the destination of the received packet is stored as the first address filter information, the relay server 2 transmits the packet to the destination. In a case where the destination of the received packet is stored as the second address filter information, the relay server 2 transmits the packet to the routing session.

Accordingly, the operator2 is able to perform communication by using the routing session established between the relay server 2 and the selected client terminal 47. In the above-described configuration, the connecting-target apparatus to which an operator is able to connect is set for each operator. Therefore, even when the communication device that the operator2 uses for logging in is changed, the operator2 is able to perform communication in a routing session established with the same partner as before. Additionally, it is easy to perform different access controls depending on operators.

Figure 13:
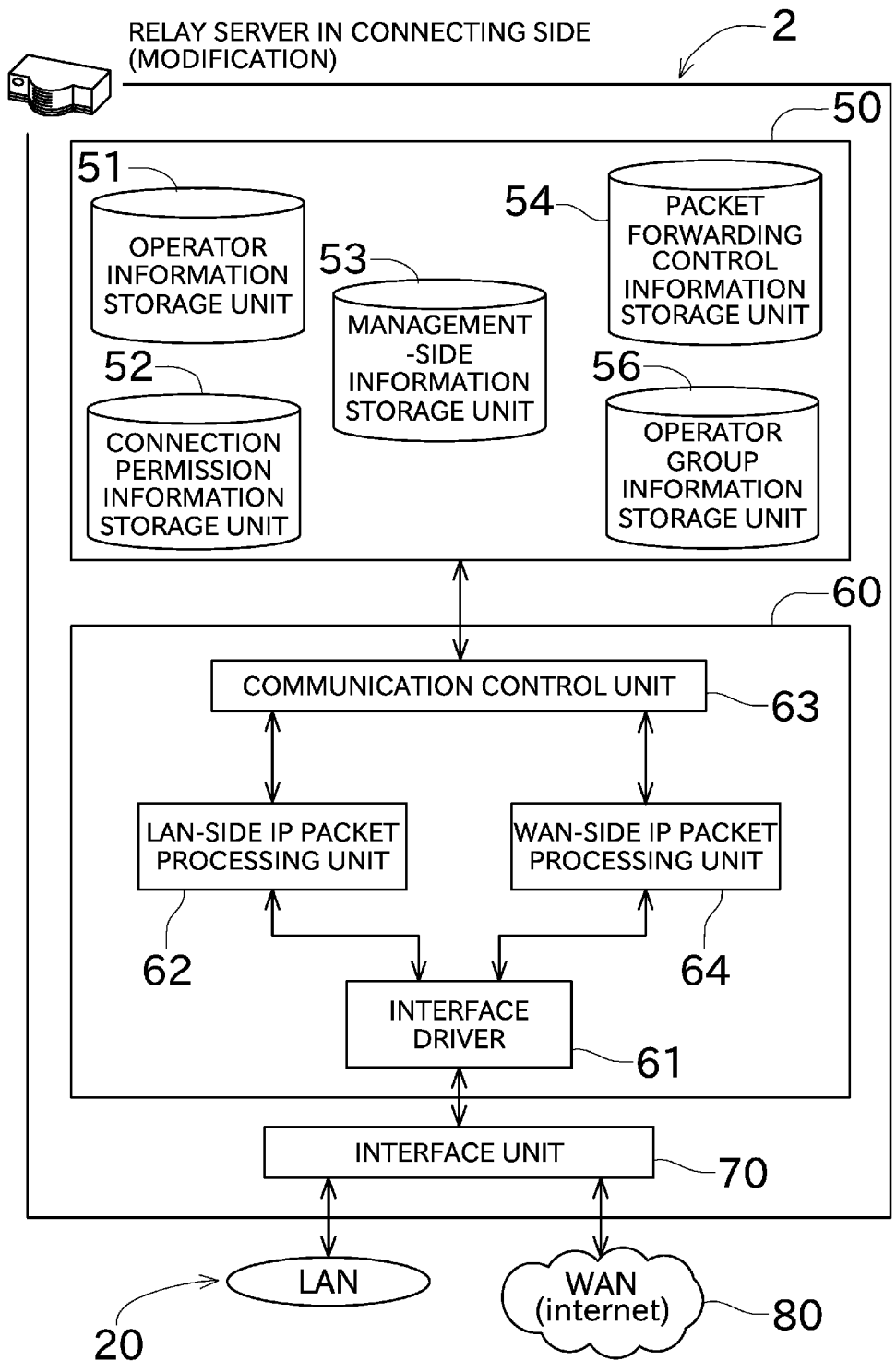
FIG. 13 is a functional block diagram showing a modification of the relay server 2 in a connecting side.

Next, a modification of the above-described preferred embodiment will be described with reference to FIGS. 13 to 15. FIG. 13 is a function block diagram showing a modification of the relay server 2. FIG. 14 is a diagram showing a content of operator group information. FIG. 15 is a diagram showing a content of connection permission information according to the modification. In the following description of the modification, configurations identical or similar to those of the above-described preferred embodiment will be denoted by the same reference signs, and descriptions thereof may be omitted.

As shown in FIG. 13, the relay server 2 of this modification includes an operator information storage unit 51, a connection permission information storage unit 52, a management-side information storage unit 53, a packet forwarding control information storage unit 54, and an operator group information storage unit 56.

In this modification, the relay server 2 includes the operator information storage unit 51 and the connection permission information storage unit 52, which are included in the relay server 1 in the above-described preferred embodiment. Therefore, the relay server 2 of this modification functions as the relay server on the manager side, and also functions as the connecting-side relay server. Accordingly, in this modification, the same relay communication system 100 as that of the above-described preferred embodiment is achieved by the relay server 2 serving as the connecting-side relay server and the relay servers 3,4 (having the same configurations as in the above-described preferred embodiment) serving as the connected-side relay servers.

In this modification, an operator group including one or a plurality of operators is prepared, and information concerning the operator group is stored in the operator group information storage unit 56 of the relay server 2. The operator group information storage unit 56 stores an operator group including a plurality of operators by using the name of a group and the operator IDs of the operators included in the operator group (belonging to the operator group), as shown in FIG. 14.

The connection permission information storage unit 52 of this modification stores the name of the operator group in association with the identification information of the connecting-target apparatus, as shown in FIG. 15. Therefore, in an example shown in FIG. 15, in a case where operators (operators whose operator IDs are Op1, Op2, and Op3) belonging to the group 1 log in by using the client terminal 21 as the used apparatus, connection between the client terminal 21 and the relay server 3 can be used. Since a process for login of the operator and a process for building a VPN are the same as in the above-described preferred embodiment, descriptions thereof are omitted.

Figure 16:
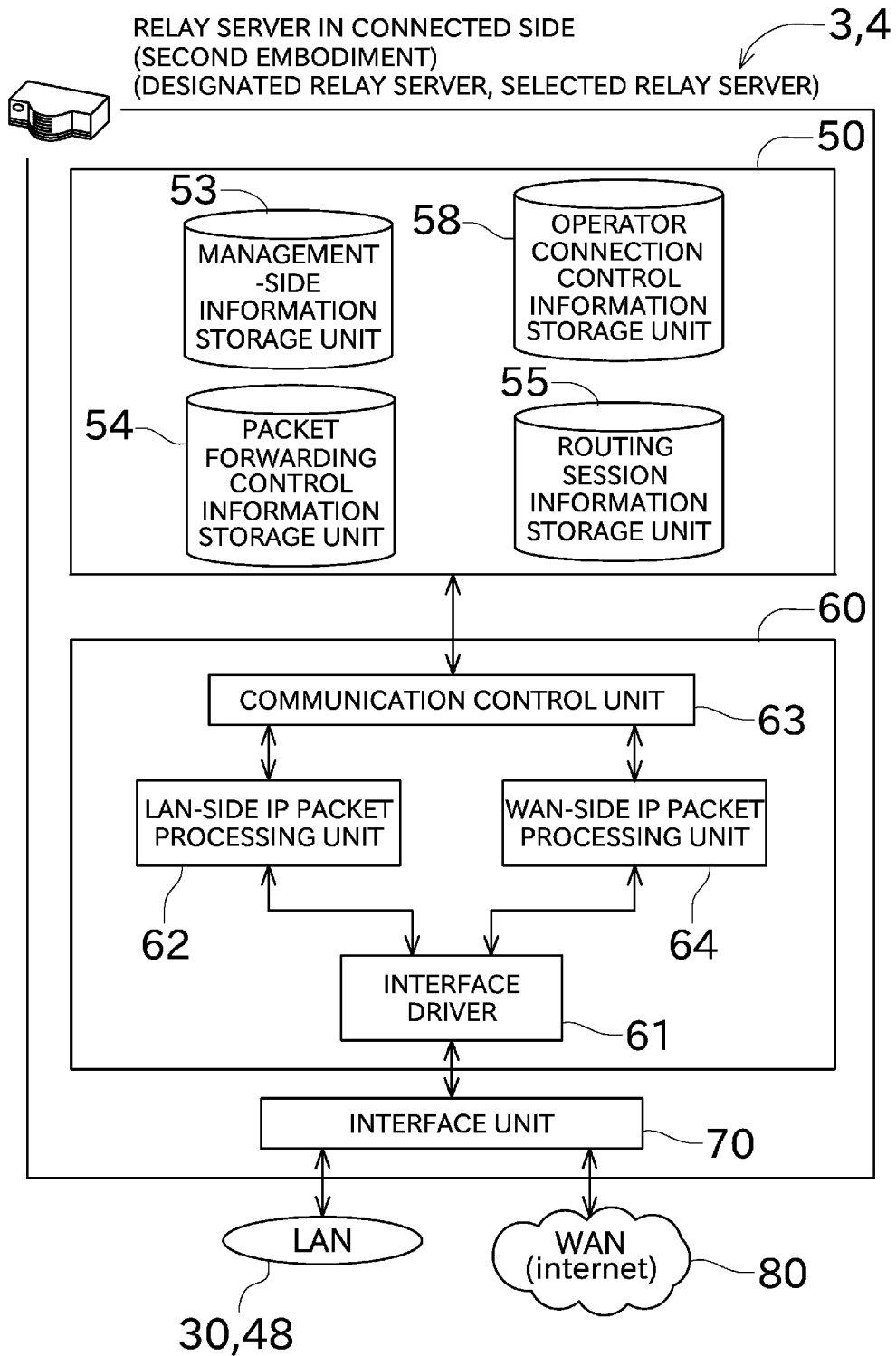
FIG. 16 is a functional block diagram of a relay server 3, 4 in a connected side according to a second preferred embodiment of the present invention.

Next, a second preferred embodiment of the present invention will be described. The second preferred embodiment is different from the above-described preferred embodiment, in that the content stored in the connection permission information storage unit 52 of the relay server 1 on the manager side is different and in that the connected-side relay server 3,4 includes the operator connection control information storage unit 58, as shown in FIG. 16. The connecting-side relay server 2 does not include the operator connection control information storage unit 58.

The connection permission information storage unit 52 of the relay server 1 of the second preferred embodiment stores connection permission information that defines an operator group including one or a plurality of operators who are able to use the relay communication system 100. The connection permission information sets a connected-side relay server to which the operator is able to connect, for each of the operator groups.

In the connection permission information shown in FIG. 17, the column "operator group ID" describes identification information of the operator group that is registered in advance. The column "operator ID" describes a list of operator IDs indicating operators included in the operator group. The column "designated relay server ID" describes the identification information of a connected-target relay server to which the operators included in the operator group are able to connect. In the following description, the relay server that is designated as a relay server to which the operator is able to connect in the connection permission information may be called "designated relay server".

Here, a case will be considered in which the operator2 (the operator whose operator ID is Op2) operates the communication device 22 to access the relay server 2 and logs in to the relay communication system 100 by using the relay server 2. Referring to the connection permission information shown in FIG. 17, the operator whose operator ID is Op2 belongs to the operator group whose operator group ID is WorkGroup1, and also belongs to the operator group whose operator group ID is WorkGroup2.

It is seen from the connection permission information shown in FIG. 17, that the operators belonging to the operator group whose operator group ID is WorkGroup1 are able to connect to the connected-side relay server 3, and the operators belonging to the operator group whose operator group ID is WorkGroup2 are able to connect to the connected-side relay server 4. The relay server 1 on the manager side transmits, to the relay server 2, the identification information of the relay server to which the operator2 is able to connect (the identification information of the relay server 3 and the relay server 4). Based on the received identification information of the relay server, the relay server 2 prepares a list of relay servers to which the operator2 is able to connect, and displays it on a display of the communication device 22.

The operator operates the communication device 22, to select a relay server that the operator desires to connect to, from the list of relay servers. Here, a case is assumed in which the user selects the relay server 3. In the following description, as described above, the relay server that the operator has selected from the designated relay servers corresponding to the operator group to which the operator having logged in to the relay communication system 100 belongs in the connection permission information shown in FIG. 17 may be called a "selected relay server".

Through the above-described operations, the operator2 can use connection between the relay server 2 (the used apparatus) and the relay server 3 (selected relay server) that the operator2 has selected from the designated relay servers. In other words, the operator2 can make a routing session, which is a session for packet forwarding, between the relay server 2 (used apparatus) and the relay server 3 (selected relay server), and can build a virtual private network (VPN) by using the routing session. In the VPN, a packet transmitted from the relay server 2 routes through the relay server 3 to reach the destination apparatus (for example, the file server 31).

Depending on setting of the selected relay server (for example, the relay server 3), the operator2 can further use connection between the relay server 3 and a predetermined client terminal (for example, the client terminal 47) belonging to the relay server 3, though details thereof will be described later. In this case, the operator2 can make routing sessions between the relay server 2 (used apparatus) and the relay server 3 (selected relay server) and between the relay server 3 (selected relay server) and the client terminal 47 (a client terminal belonging to the selected relay server), and can build a VPN by using the two routing sessions. In this VPN, a packet transmitted from the relay server 2 routes through the relay server 3 and the client terminal 47, to reach a destination apparatus (for example, the file server 46).

The operator connection control information storage unit 58 included in the relay server 3, 4 stores operator connection control information. In a case where a designated relay server corresponding to an operator group is the relay server 3, 4 itself in the connection permission information stored in the connection permission information storage unit 52 of the relay server 1 on the manager side, the operator connection control information designates, for each operator belonging to the operator group, a connected-side apparatus to which the operator is able to connect.

In the operator connection control information shown in FIG. 19, the column "operator ID" describes the identification information of the operator. The column "designated apparatus ID" describes the identification information of the connected-side apparatus to which the corresponding operator is able to connect.

In the following description, the connected-side apparatus designated as an apparatus to which an operator is able to connect may be referred to as a designated apparatus. As the designated apparatus, two types of apparatus are conceivable, namely, a connected-side relay server and a client terminal belonging to the relay server.

FIG. 19 shows an example of the operator connection control information stored in the operator connection control information storage unit 58 of the relay server 3. In this example, the column "operator ID" describes Op1, Op2, and Op3, which are the identification information of operators. In the connection permission information shown in FIG. 17, these operators belong to the operator group (the operator group whose operator group ID is WorkGroup1) that designates the relay server 3.

In the operator group whose operator group ID is WorkGroup2, the connection permission information designates not the relay server 3 but the relay server 4 (see FIG. 17). Accordingly, an operator (for example, an operator whose operator ID is Op4) belonging to the operator group whose operator group ID is WorkGroup2 is not stored in the operator connection control information storage unit 58 of the relay server 3, but is stored in the operator connection control information storage unit 58 of the relay server 4. The operator connection control information storage unit 58 of each of the relay servers 3 and 4 stores the operator connection control information concerning only the operators belonging to the operator group in which the designated relay server is the relay server 3, 4 itself. Accordingly, the operator connection control information can be independently stored such that the content thereof is divided between the relay servers 3 and 4. This can prevent enlargement of the content stored in each of the relay servers 3 and 4, and enables omission of a control to synchronize the contents stored in the relay servers 3 and 4.

The column "designated apparatus ID" designates the identification information of the designated apparatus in association with the identification information of each operator. In an example shown in FIG. 19, the operator whose operator ID is Op1 can use the relay server 3, the operator whose operator ID is Op2 can use the client terminal 47, and the operator whose operator ID is Op3 can use the relay server 3 and the client terminal 42.

In a case where, in the connection permission information, the designated apparatus associated with an operator is an apparatus (for example, the client terminal 47) other than the relay server 3, the operator can use a routing session made between the relay server 3 and the designated apparatus.

Here, a case will be considered in which, similarly to the above-described example, the operator2 (the operator whose operator ID is Op2) operates the communication device 22 to access the relay server 2 and logs in to the relay communication system 100 by using the relay server 2. Referring to the connection permission information (FIG. 17) stored in the connection permission information storage unit 52 of the relay server 1 on the manager side, the relay server 3 is designated for the operator group to which the operator whose operator ID is Op2 belongs, (that is, the relay server 3 serves as the designated relay server). Accordingly, the operator2 can use a routing session made between the relay server 2 and the relay server 3.

Referring to the operator connection control information (FIG. 19) stored in the operator connection control information storage unit 58 of the relay server 3 serving as the designated relay server, the operator whose operator ID is Op2 is able to connect to the client terminal 47. Accordingly, the operator2 can use a routing session made between the relay server 3 and the client terminal 47.

As a result, the operator2 is able to connect between the relay server 2 and the client terminal 47 via two routing sessions, and build a VPN by using these routing sessions.

Thus, in the relay communication system 100 of this preferred embodiment, the connection permission information stored in the relay server 1 on the manager side and the operator connection control information stored in the connected-side relay server 3 serving as the designated relay server are combined, so that which of the connected-side apparatuses can be used as the routing apparatus by the operator to build a VPN is defined.

In the connection permission information storage unit 52 stored in the relay server 1 on the manager side, a relay server (designated relay server) to which connection is permitted is associated with the operator group ID (not with the identification information of the connecting-side relay server or the client terminal). In the operator connection control information storage unit 58 stored in the connected-side relay server 3 serving as the designated relay server, an apparatus (designated apparatus) to which connection is permitted is associated with the operator ID (not with the identification information of the connecting-side relay server or the client terminal).

Accordingly, even in a case where the operator2 uses a different apparatus for logging in, the apparatus to which connection is permitted is as described above. For example, if the operator2 operates the communication device 23 to access the client terminal 21 and logs in to the relay communication system 100 by using the client terminal 21, the operator2 can build a VPN by using a routing session made between the client terminal 21 and the relay server 3 and a routing session made between the relay server 3 and the client terminal 47.

Similarly to the above-described preferred embodiment, the routing apparatuses included in the VPN exchange the address filter information, and thus each of the routing apparatuses synthesizes address filter information in which the address filter information associated with itself is associated with another routing apparatus. In the second preferred embodiment, the packet forwarding control information as shown in FIG. 18 is prepared between the relay server 2 and the relay server 3.

Figure 20:
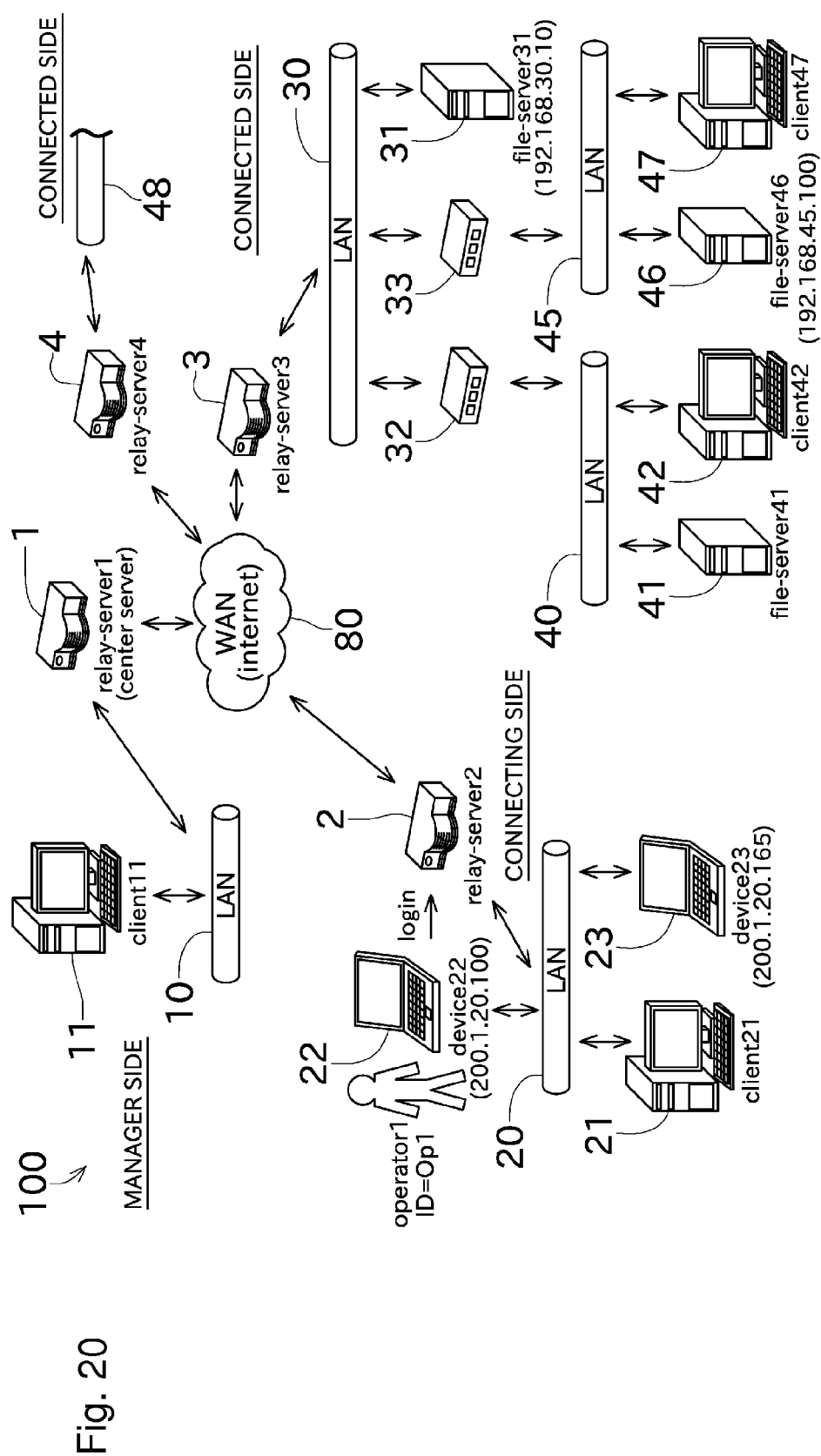
FIG. 20 is a diagram for explaining a case where an operator 1 logs in by using the relay server 2.
Figure 21:
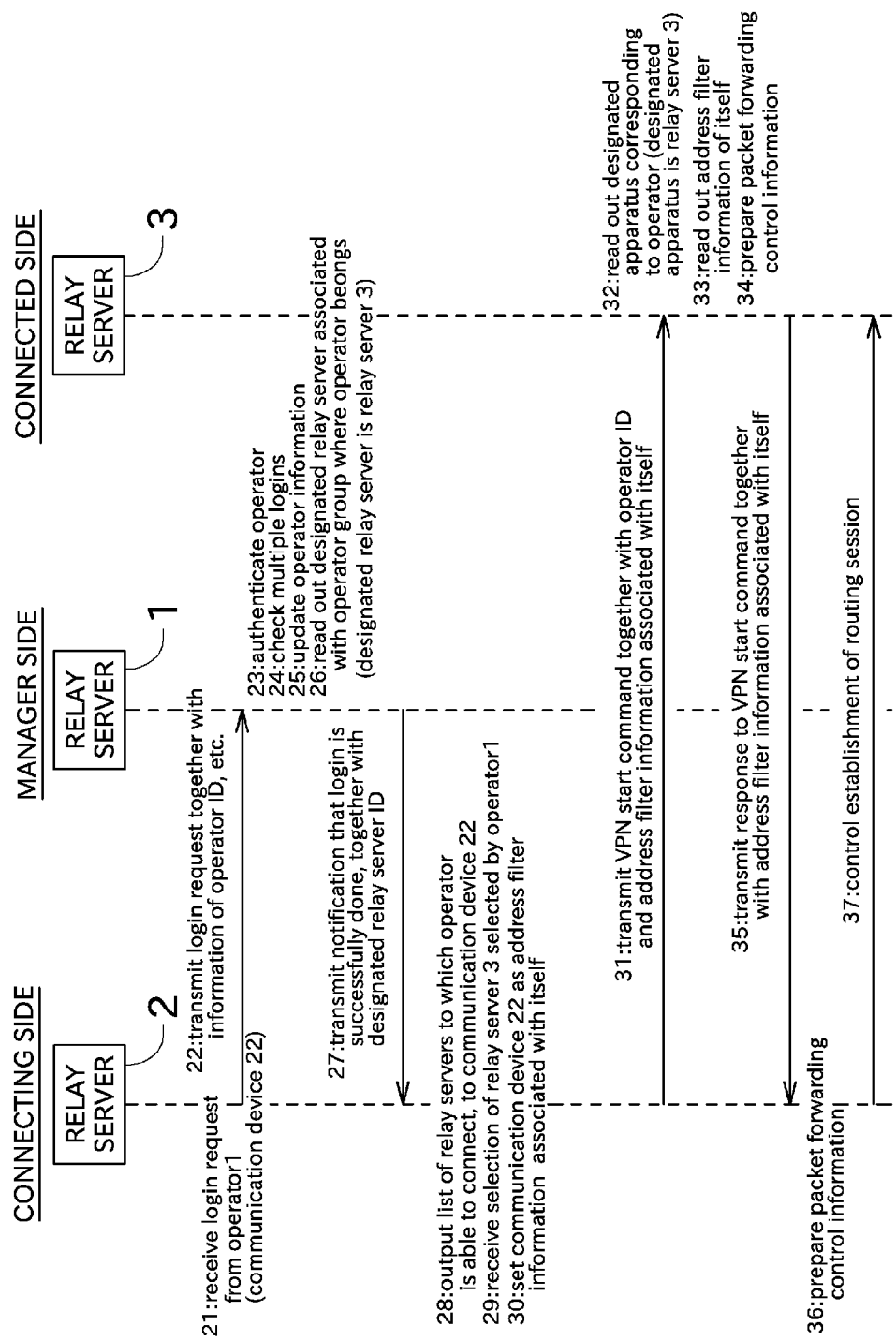
FIG. 21 is a sequence diagram showing a process for starting a VPN in the case shown in FIG. 20.

Next, a specific flow in which the operator logs in to the relay communication system 100 and builds a VPN will be described. Firstly, an example in which the operator1 logs in to the system by using the relay server 2 will be described with reference to FIGS. 20 and 21. FIG. 20 is a network diagram showing a case where the operator1 logs in and starts a VPN. FIG. 21 is a sequence diagram showing a process through which the operator1 logs in and starts a VPN. Sequence Numbers 21 to 30 in FIG. 21, which are the same as those in the above-described preferred embodiment, will be described in a simplified manner.

As shown in FIG. 20, the operator1 performs an appropriate operation on the communication device 22 to access the relay server 2, and requests a login by using the relay server 2 as the used apparatus. The connecting-side relay server 2 receives a login request (Sequence Number 21 in FIG. 21), and transmits the login request to the relay server 1 on the manager side (Sequence Number 22). The relay server 1 on the manager side authenticates the operator, and checks multiple logins. Then, in a case of permitting the log in, the relay server 1 on the manager side updates the operator information (Sequence Numbers 23 to 25).

Then, the relay server 1 on the manager side refers to the connection permission information stored in the connection permission information storage unit 52, to read out an identification information of the relay server to which the operator2 who has been permitted to log in is able to connect (Sequence Number 26). In the connection permission information shown in FIG. 17, the relay server 3 is associated with the operator group to which the operator1 belongs. Therefore, the relay server 1 on the manager side transmits, to the relay server 2, the identification information of the relay server 3 serving as the designated relay server together with a notification that the login is permitted (Sequence Number 27).

The relay server 2, which receives this notification, prepares a list of designated relay servers received from the relay server 1 (that is, a list including only the relay server 3), and displays, on the communication device 22, the list together with the notification that the login has been permitted (Sequence Number 28). The operator is requested to select a relay server that he/she desires to connect to from the list of designated relay servers. In this example, only one relay server is selectable. Therefore, the operator1 operates the communication device 22, to select the relay server 3 as the relay server that he/she desires to connect to. The relay server 2 receives the selection of the relay server 3 selected by the operator1 (Sequence Number 29), and sets, as the address filter information associated with the relay server 2 itself, the communication device 22 that the operator1 has directly operated in requesting the login (Sequence Number 30).

This address filter information describes the address of the communication device 22 and, as a name associated with it, the name of the operator1. Then, the relay server 2 transmits, to the selected relay server 3 (selected relay server), the operator ID of the operator1 and the address filter information associated with the relay server 2 itself, and also transmits a VPN start command (Sequence Number 31).

The relay server 3 receives the start command, and refers to the operator connection control information stored in the operator connection control information storage unit 58, to read out the designated apparatus associated with the operator ID of the operator1 received (Sequence Number 32). In the operator connection control information shown in FIG. 19, the designated apparatus associated with the operator1 is the relay server 3 itself. Therefore, the relay server 3 readouts the address filter information associated with itself (the address and name of the file server 31) (Sequence Number 33). The relay server 3 combines the address filter information associated with itself with the address filter information of the relay server 2 received in Sequence Number 31, to prepare the packet forwarding control information, and stores it into the packet forwarding control information storage unit 54 (Sequence Number 34).

As a result, in the packet forwarding control information storage unit 54 of the relay server 3, the packet forwarding control information including two pieces of address filter information is stored as shown in FIG. 18. The relay server 3 transmits, to the relay server 2, the address filter information associated with itself together with a notification that the VPN start command has been accepted (Sequence Number 35).

Upon reception of a response from the relay server 3, the relay server 2 combines the address filter information associated with itself prepared in Sequence Number 30 with the address filter information received from the relay server 3, to prepare the packet forwarding control information, and stores it into the packet forwarding control information storage unit 54 (Sequence Number 36). As a result, in the packet forwarding control information storage unit 54 of the relay server 2, too, the packet forwarding control information including two pieces of address filter information is stored as shown in FIG. 18.

Through the above-described process, exchange of the address filter information between the relay server 2 and the relay server 3 is completed. After the exchange of the address filter information, both the packet forwarding control information storage unit 54 of the relay server 2 and the packet forwarding control information storage unit 54 of the relay server 3 store the content shown in FIG. 18.

Then, the relay server 2 performs a communication control on the relay server 3 to establish a routing session (Sequence Number 37). As a result, a routing session is established between the relay server 2 and the relay server 3, to allow communication based on the VPN to be performed between the communication device 22 operated by the operator1 and the file server 31.

Figure 22:
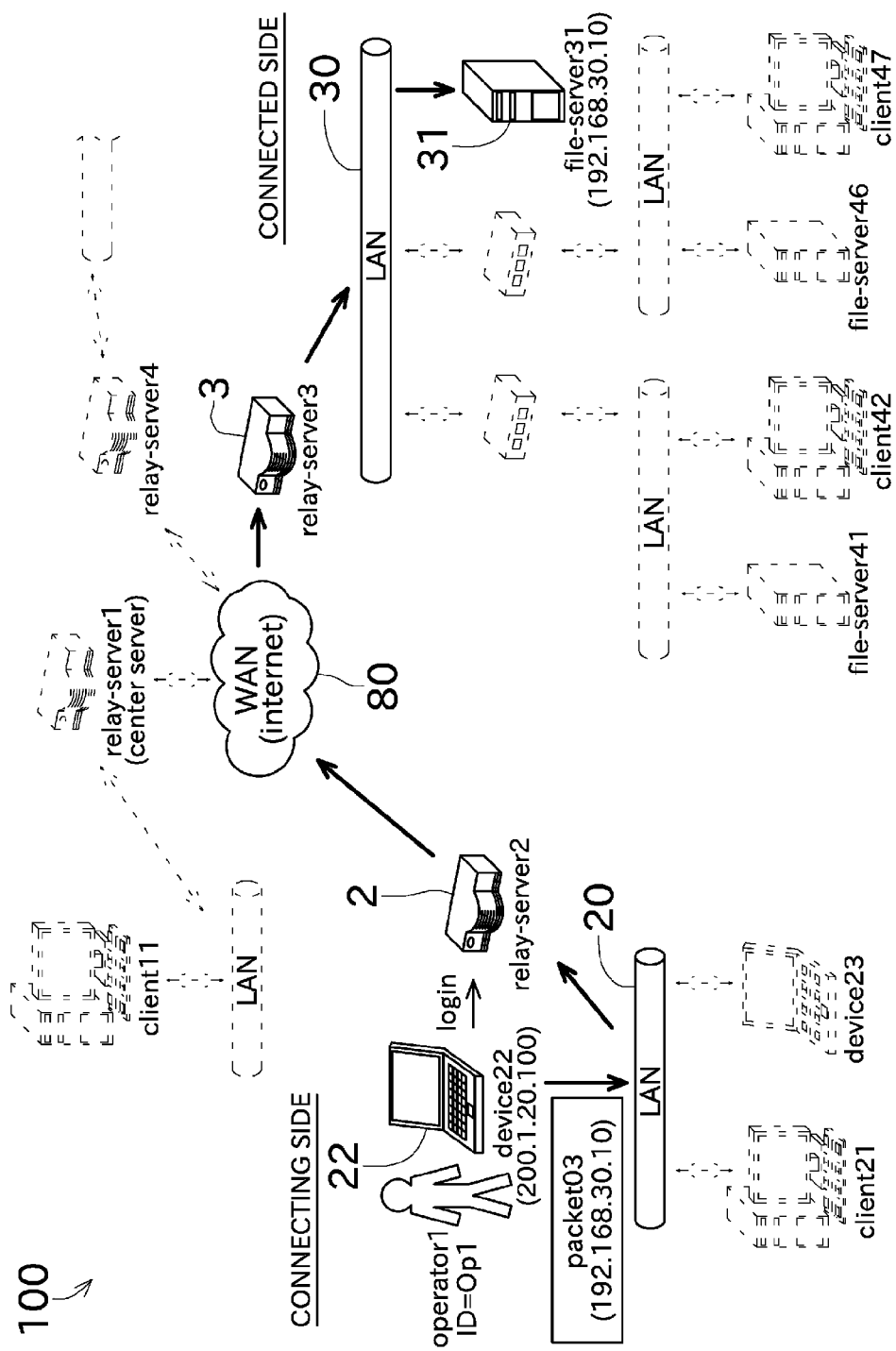
FIG. 22 is a diagram for explaining a path through which the communication device 22 transmits a packet to a file server 31 in the case shown in FIG. 20.
Figure 23:
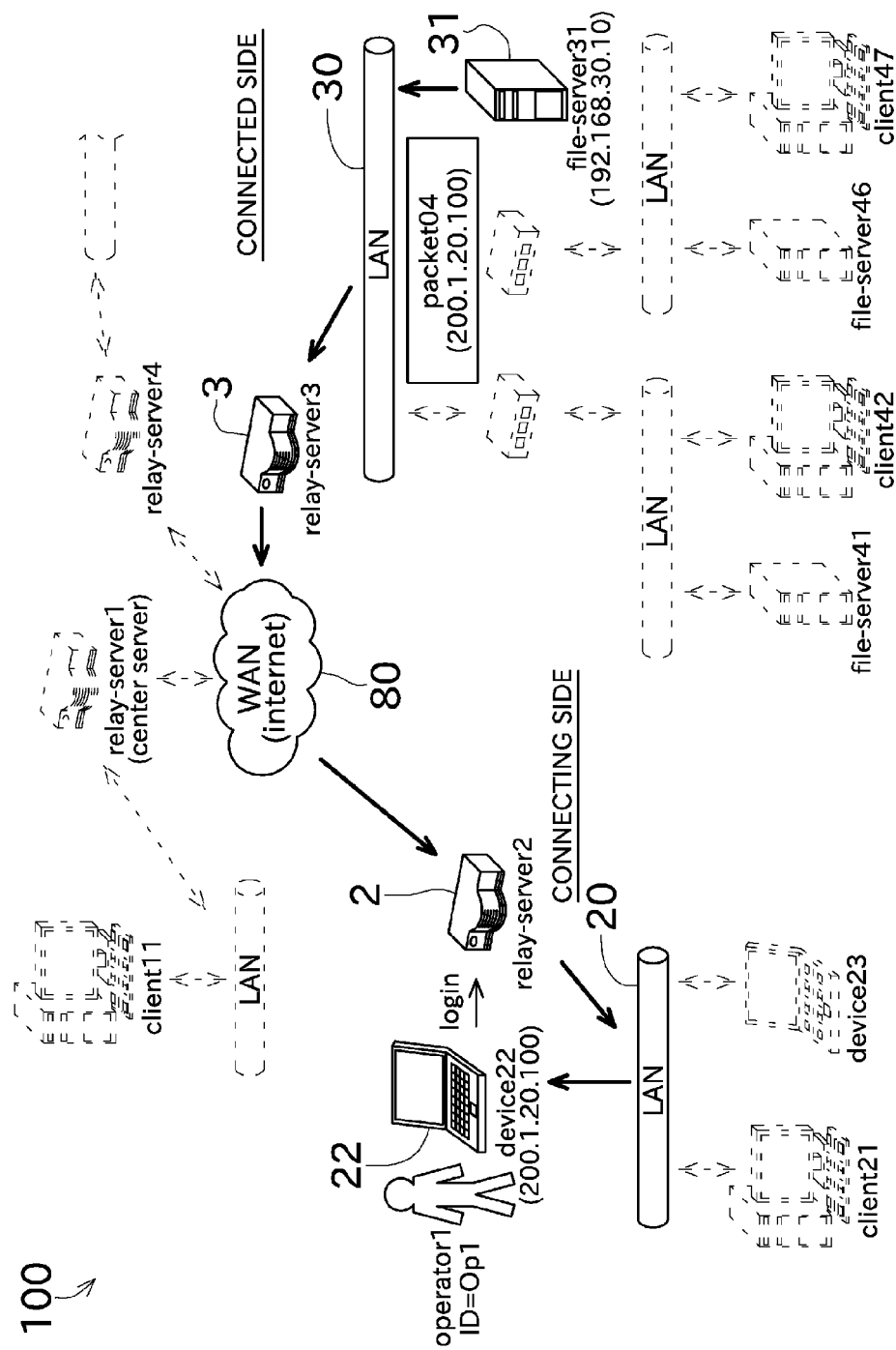
FIG. 23 is a diagram for explaining a path through which the file server 31 transmits a packet to the communication device 22 in the case shown in FIG. 20.

Next, a process for routing a packet by using the established routing session will be described. FIG. 22 is a diagram for explaining a path through which the communication device 22 transmits a packet to the file server 31. FIG. 23 is a diagram for explaining a path through which the file server 31 transmits a packet to the communication device 22.

Firstly, a process performed when the relay server 2 receives a third packet (packet03) shown in FIG. 22 will be described. The third packet is transmitted by the communication device 22, and the IP address (192.168.30.10) of the file server 31 is designated as the destination address of the third address.

The relay server 2 receives the third packet, and then compares the packet forwarding control information stored in the packet forwarding control information storage unit 54 (FIG. 18) against the destination address of the third packet. The relay server 2 searches for a routing apparatus that is able to directly transmit a packet to the destination indicated in the third packet. As shown in FIG. 18, the destination address (192.168.30.10) of the third packet is designated by the address filter information associated with the relay server 3. Accordingly, the relay server 2 permits forwarding of the third packet, and transmits the third packet to the relay server 3 via the routing session established between the relay server 2 and the relay server 3.

The relay server 3 receives the third packet, and similarly to the relay server 2, compares the packet forwarding control information (FIG. 18) stored in the packet forwarding control information storage unit 54 against the destination address of the third packet. As a result, the relay server 3 detects that the relay server 3 itself is able to directly transmit a packet to the destination (192.168.30.10) indicated in the third packet. Therefore, the relay server 3 permits forwarding of the third packet, and transmits the third packet to the file server 31.

Next, a process performed when the relay server 3 receives a fourth packet (packet04) shown in FIG. 23 will be described. The fourth packet is transmitted by the file server 31, and the IP address (200.1.20.100) of the communication device 22 is designated as the destination address of the fourth packet.

After receiving the fourth packet, the relay server 3 performs the same process as described above, and detects that the destination address (200.1.20.100) of the fourth packet is designated by the address filter information associated with the relay server 2. Therefore, the relay server 3 permits forwarding of the fourth packet, and transmits the fourth packet to the relay server 2 via the routing session established between the relay server 3 and the relay server 2.

The relay server 2 receives the fourth packet, and performs the same process as described above, to detect that the destination address (200.1.20.100) of the fourth packet is designated by the address filter information associated with itself (relay server 2). Therefore, the relay server 2 permits forwarding of the fourth packet, and transmits the fourth packet to the communication device 22.

Figure 24:
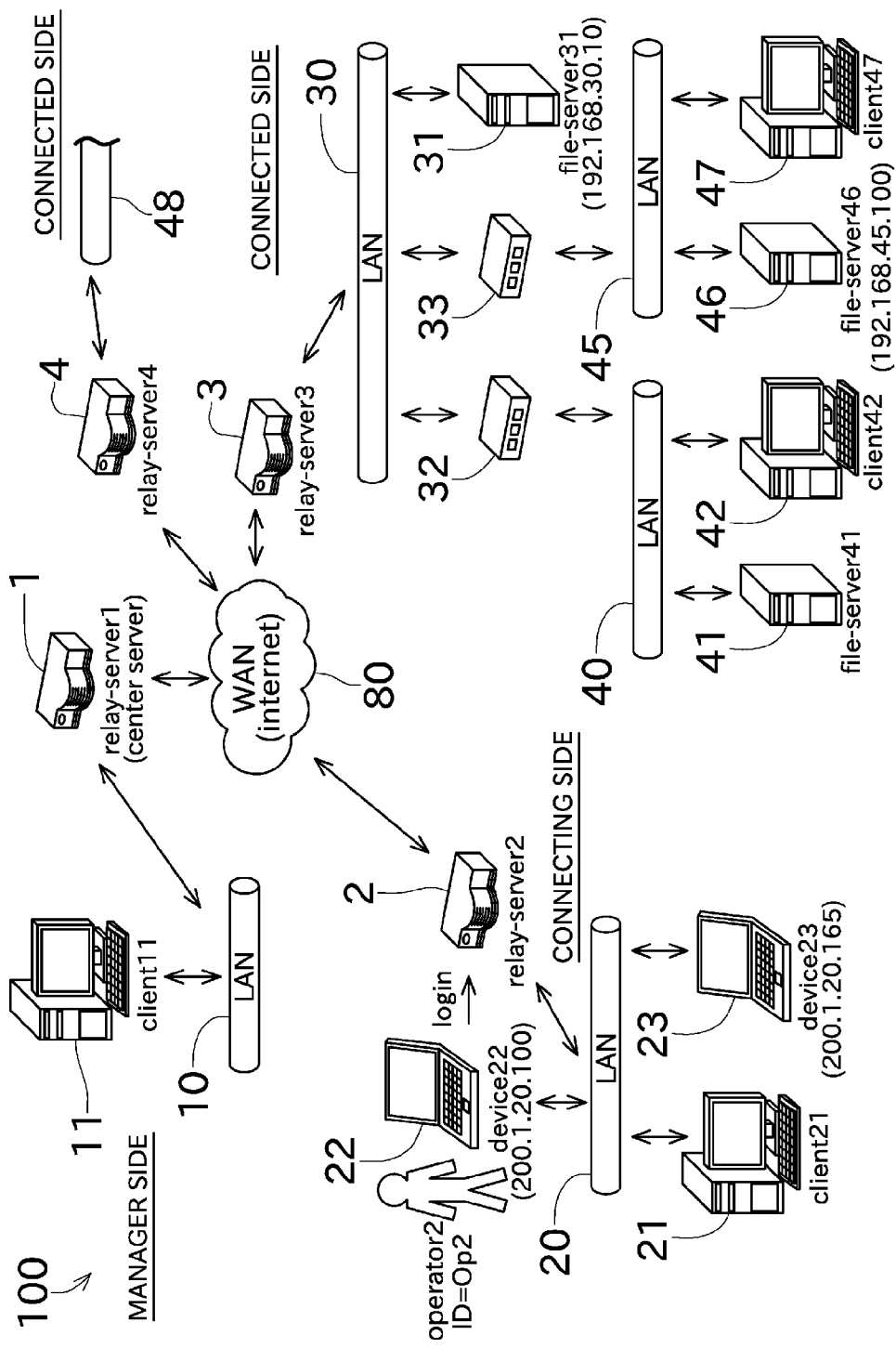
FIG. 24 is a diagram for explaining a case where an operator2 logs in by using the relay server 2.
Figure 25:
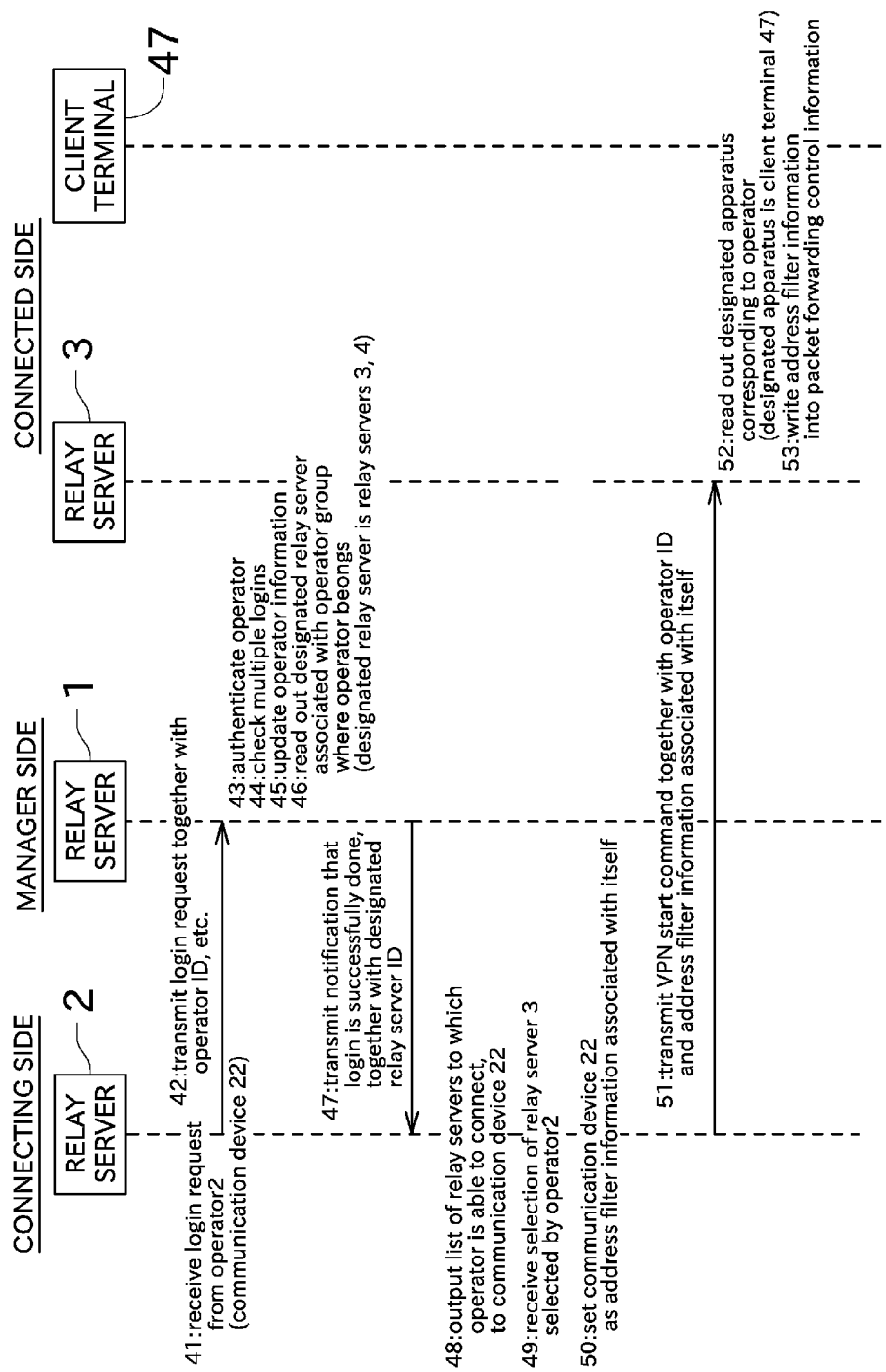
FIG. 25 is a sequence diagram showing the former half of a process for starting a VPN in the case shown in FIG. 24.
Figure 26:
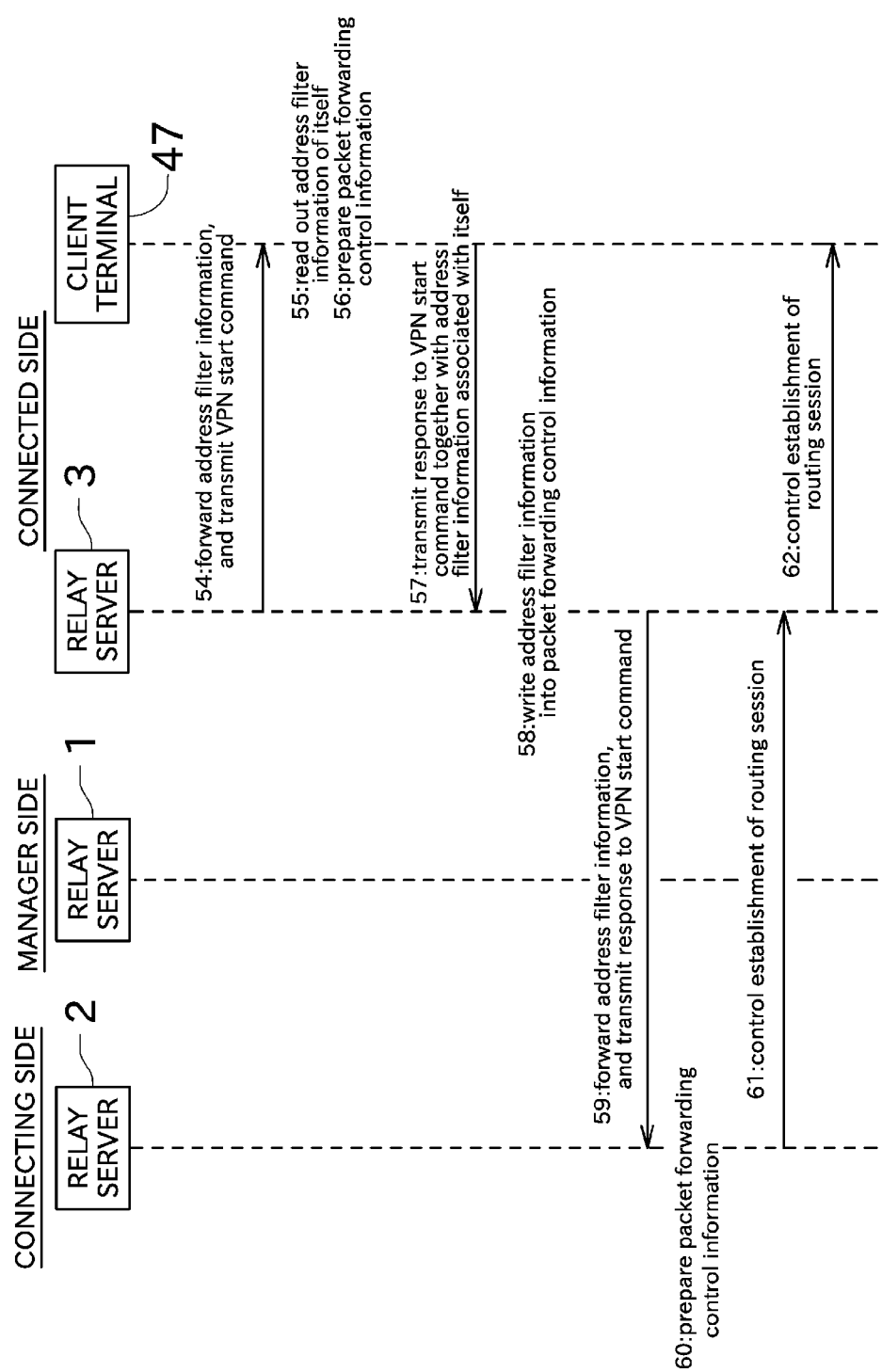
FIG. 26 is a sequence diagram showing the latter half of the process for starting the VPN in the case shown in FIG. 24.

Next, an example in which the operator2 logs in to the system by using the relay server 2 will be described with reference to FIGS. 24 to 26. FIG. 24 is a network diagram showing the operator2 logs in and starts a VPN. FIGS. 25 and 26 are sequence diagrams showing a process performed when the operator2 logs in and starts a VPN. Sequence Numbers 41 to 50 in FIG. 25, which are the same as those in the above-described preferred embodiment, will be described in a simplified manner.

A case will be considered in which, in the LAN 20 in the connecting side, the operator2 performs an appropriate operation on the communication device 22 to access the relay server 2 and requests a login by using the relay server 2 as the used apparatus, as shown in FIG. 24. The connecting-side relay server 2 receives the login request (Sequence Number 41 in FIG. 25), and transmits the login request to the relay server 1 on the manager side (Sequence Number 42). The relay server 1 on the manager side authenticates the operator, and checks multiple logins. Then, in a case of permitting the login, the relay server 1 updates the operator information (Sequence Numbers 43 to 45).

Then, the relay server 1 on the manager side refers to the connection permission information stored in the connection permission information storage unit 52, to read out an identification information of the relay server to which the operator2 who has been permitted to log in is able to connect (Sequence Number 46). In the connection permission information shown in FIG. 17, the operator2 belongs to two operator groups. One of the operator groups is associated with the relay server 3, and the other of the operator groups is associated with the relay server 4. Accordingly, the relay server 1 on the manager side transmits, to the relay server 2, the identification information of the relay server 3 and the relay server 4 serving as the designated relay servers together with a notification that the login is permitted (Sequence Number 47).

The relay server 2, which receives this notification, prepares a list of designated relay servers received from the relay server 1 (that is, a list including the relay server 3 and the relay server 4), and displays, on the communication device 22, the list together with the notification that the login is permitted (Sequence Number 48). Here, a case is assumed in which the operator2 operates the communication device 22 to select, from the list, the relay server 3 as the relay server to which he/she desires to connect to. The relay server 2 receives the selection of the relay server 3 selected by the operator2 (Sequence Number 49), and then sets, as the address filter information associated with the relay server 2 itself, the communication device 22 that the operator2 has directly operated in requesting the login (Sequence Number 50).

The address filter information prepared in Sequence Number 50 describes an address that indicates the address of the communication device 22, and also describes, as a name associated with it, the name of the operator2. Then, the relay server 2 transmits, to the selected relay server 3 (selected relay server), the operator ID of the operator2 and the address filter information associated with the relay server 2 itself, and also transmits a VPN start command (Sequence Number 51).

The relay server 3 receives the start command, and refers to the operator connection control information stored in the operator connection control information storage unit 58, to read out the designated apparatus associated with the operator ID of the operator2 received (Sequence Number 52). In the operator connection control information shown in FIG. 19, the designated apparatus associated with the operator2 is the client terminal 47.

Therefore, the relay server 3 stores the address filter information of the relay server 2 received in Sequence Number 51 into the packet forwarding control information storage unit 54 (Sequence Number 53). Then, the relay server 3 transmits, to the client terminal 47 serving as the designated apparatus, the address filter information received from the relay server 2 as well as a VPN start command (Sequence Number 54 in FIG. 26).

The client terminal 47 receives the start command, and reads out the address filter information associated with the client terminal 47 itself (Sequence Number 55). The address filter information (pre-set address filter information) stored in the client terminal 47 describes the name and address of the file server 46. Then, the client terminal 47 combines the address filter information of the client terminal 47 itself with the address filter information of the relay server 2 received in Sequence Number 54, to prepare packet forwarding control information, and stores it into the packet forwarding control information storage unit (Sequence Number 56).

As a result, in the packet forwarding control information storage unit of the client terminal 47, the packet forwarding control information including two pieces of address filter information is stored as shown in FIG. 27. Then, the client terminal 47 transmits, to the relay server 3, the address filter information associated with the client terminal 47 itself together with a notification that the VPN start command is accepted (Sequence Number 57).

Upon reception of a response from the client terminal 47, the relay server 3 stores the address filter information of the client terminal 47 into the packet forwarding control information storage unit 54 (Sequence Number 58). As a result of this processing and the processing performed in Sequence Number 53, the same content (the content shown in FIG. 27) as the content stored in the packet forwarding control information storage unit of the client terminal 47 is stored in the packet forwarding control information storage unit 54 of the relay server 3, too. Then, the relay server 3 forwards, to the relay server 2, the address filter information received from the client terminal 47 together with the notification that the VPN start command is accepted (Sequence Number 59).

Upon reception of a response from the relay server 3, the relay server 2 combines the address filter information associated with the relay server 2 itself prepared in Sequence Number 50, with the address filter information of the client terminal 47 received in Sequence Number 59, to prepare the packet forwarding control information, and stores it into the packet forwarding control information storage unit 54 (Sequence Number 60). As a result, the same content (the content shown in FIG. 27) as the content stored in the packet forwarding control information storage unit of the client terminal 47 is stored in the packet forwarding control information storage unit 54 of the relay server 2, too.

Through the above-described process, exchange of the address filter information between the relay server 2 and the client terminal 47 via the relay server 3 is completed. After the exchange of the address filter information, all of the packet forwarding control information storage unit s of the relay server 2, the relay server 3, and the client terminal 47 store the content shown in FIG. 27.

Then, the relay server 2 performs a communication control on the relay server 3 to establish a routing session (Sequence Number 61). Additionally, the relay server 3 performs a communication control on the client terminal 47 to establish a routing session (Sequence Number 62). As a result, routing sessions are established between the relay server 2 and the relay server 3, and also between the relay server 3 and the client terminal 47, to allow communication based on the VPN to be performed between the communication device 22 operated by the operator2 and the file server 46.

A situation may occur in which the relay server 3 transmits the VPN start command to the client terminal 47 in the processing of Sequence Number 54 shown in FIG. 26 but nevertheless the response from the client terminal 47 is not received due to a communication failure or the like. In such a case, the relay server 3 notifies the relay server 2 of occurrence of an error, and the relay server 2 displays, on the communication device 22 operated by the operator2, a notification that connection has failed. This allows the operator2 to properly recognize occurrence of an abnormal situation where the VPN cannot be started.

Figure 28:
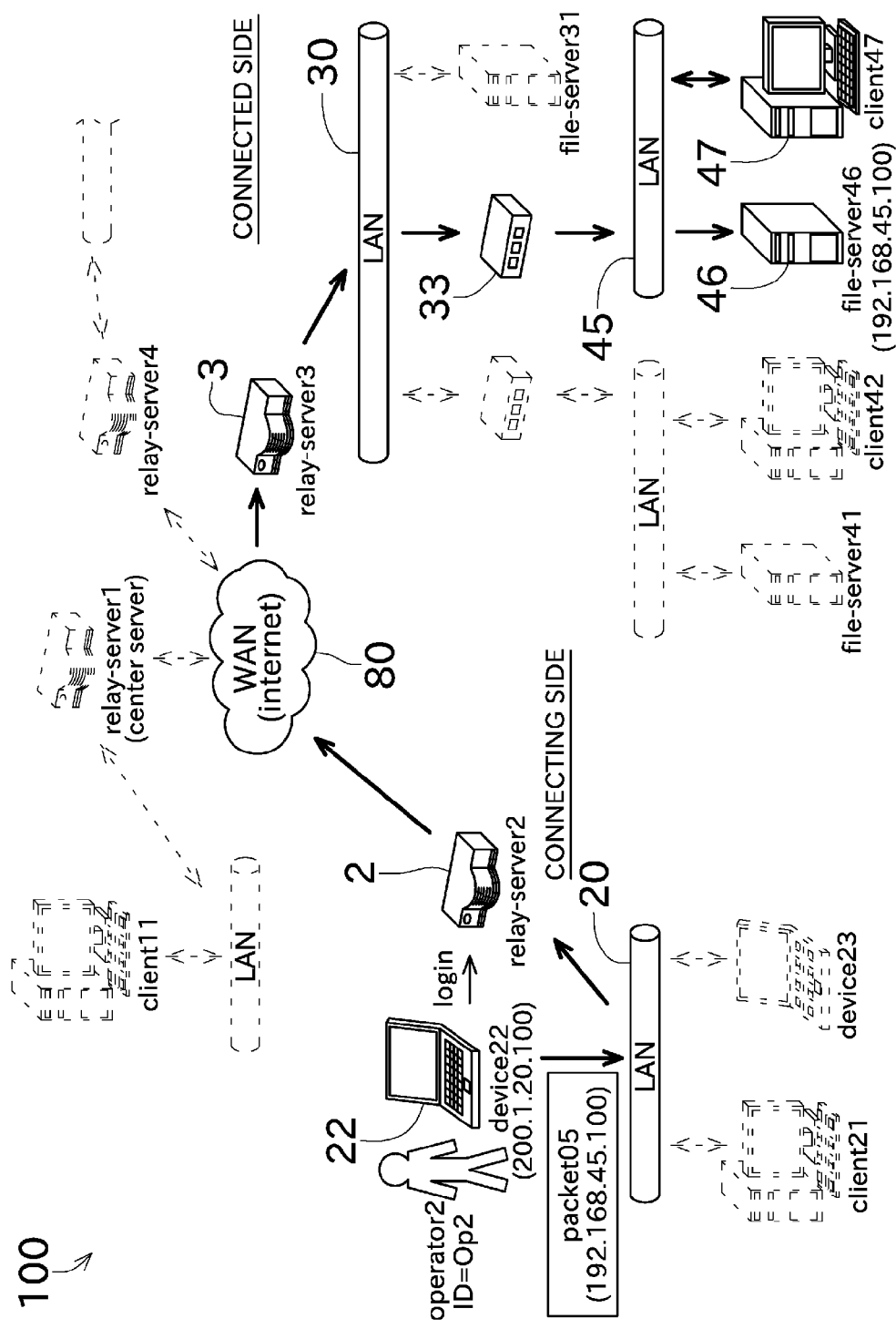
FIG. 28 is a diagram for explaining a path through which the communication device 22 transmits a packet to the file server 46 in the case shown in FIG. 24.
Figure 29:
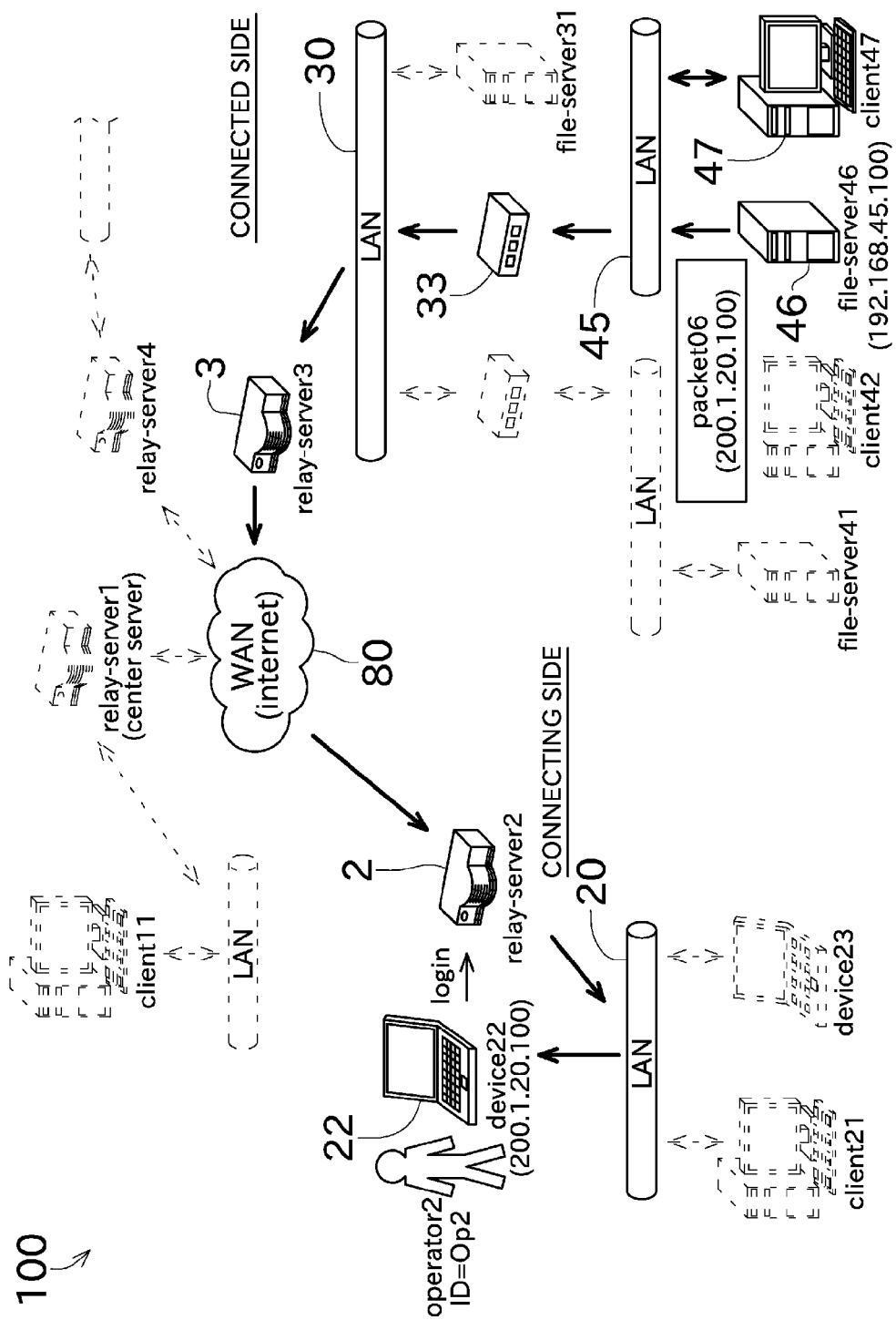
FIG. 29 is a diagram for explaining a path through which the file server 46 transmits a packet to the communication device 22 in the case shown in FIG. 24.

Next, a process for routing a packet by using the established routing session will be described. FIG. 28 is a diagram for explaining a path through which the communication device 22 transmits a packet to the file server 46. FIG. 29 is a diagram for explaining a path through which the file server 46 transmits a packet to the communication device 22.

Firstly, a process performed when the relay server 2 receives a fifth packet (packet05) shown in FIG. 28 will be described. The fifth packet is transmitted by the communication device 22, and the IP address (192.168.45.100) of the file server 46 is designated as the destination address of the fifth address.

The relay server 2 receives the fifth packet, and compares the packet forwarding control information (FIG. 27) stored in the packet forwarding control information storage unit 54 against the destination address of the fifth packet. The relay server 2 searches for a routing apparatus that is able to directly transmit a packet to the destination indicated in the fifth packet. As shown in FIG. 27, the destination address (192.168.45.100) of the fifth packet is designated by the address filter information associated with the client terminal 47. Accordingly, the relay server 2 permits forwarding of the fifth packet. A routing session that directly connects the relay server 2 and the client terminal 47 to each other does not exist, but the fact that the client terminal 47 belongs to the relay server 3 can be recognized by the relay server 2 side. Therefore, the relay server 2 transmits the fifth packet to the relay server 3 via the routing session established between the relay server 2 and the relay server 3.

The relay server 3 receives the fifth packet, and similarly to the relay server 2, compares the packet forwarding control information (FIG. 27) stored in the packet forwarding control information storage unit 54 against the destination address of the fifth packet. As a result, the relay server 3 detects that the client terminal 47 is able to directly transmit a packet to the destination (192.168.45.100) indicated in the fifth packet. Therefore, the relay server 3 permits forwarding of the fifth packet, and transmits the fifth packet to the client terminal 47 via the routing session established between the relay server 3 and the client terminal 47.

The client terminal 47 receives the fifth packet, and similarly to the relay server 3, compares the packet forwarding control information (FIG. 27) stored in the packet forwarding control information storage unit 54 against the destination address of the fifth packet. As a result, the client terminal 47 detects that the client terminal 47 itself is able to directly transmit a packet to the destination (192.168.45.100) indicated in the fifth packet. Therefore, the client terminal 47 permits forwarding of the fifth packet, and transmits the fifth packet to the file server 46.

Next, a process performed when the client terminal 47 receives a sixth packet (packet06) shown in FIG. 29 will be described. The sixth packet is transmitted by the file server 46, and the IP address (200.1.20.100) of the communication device 22 is designated as the destination address of the sixth packet.

The client terminal 47 receives the sixth packet, and then performs the same process as described above, to detect that the destination address (200.1.20.100) of the sixth packet is designated by the address filter information associated with the relay server 2. Therefore, the client terminal 47 permits forwarding of the sixth packet. Since a routing session that directly connects the client terminal 47 and the relay server 2 to each other does not exist, the client terminal 47 transmits the sixth packet to the relay server 3 via the routing session established between the client terminal 47 itself and the relay server 3 to which the client terminal 47 itself belongs.

After receiving the sixth packet, the relay server 3 performs the same process as described above, to detect that the destination address (200.1.20.100) of the sixth packet is designated by the address filter information associated with the relay server 2. Therefore, the relay server 3 permits forwarding of the sixth packet, and transmits the sixth packet to the relay server 2 via the routing session established between the relay server 3 and the relay server 2.

The relay server 2 receives the sixth packet, and performs the same process as described above, to detect that the destination address (200.1.20.100) of the sixth packet is designated by the address filter information associated with itself (relay server 2). Therefore, the relay server 2 permits forwarding of the sixth packet, and transmits the sixth packet to the communication device 22.

Although FIGS. 20 to 24 illustrate a case where the operator1 and operator2 log in by using the relay server 2, it may be possible that the operator1 and operator2 log in by using the client terminal 21 instead of the relay server 2. In such a case, the process that the relay server 2 performs in the sequence diagrams shown in FIGS. 21, 25, and 26 is performed by the client terminal 21. As a result, in a case where the operator1 logs in by using the client terminal 21, referring to the example shown in FIG. 22, a packet transmitted by the client terminal 21 routes through the relay server 2 and the relay server 3, and reaches the file server 31. In a case where the operator2 logs in by using the client terminal 21, referring to the example shown in FIG. 28, a packet transmitted by the client terminal 21 routes through the relay server 2, the relay server 3, and the client terminal 47, and reaches the file server 46.

In a case where an operator logs in by using the client terminal 21, the following process is performed for authentication of the operator. Upon reception of a login request from the operator, the client terminal 21 transmits the login request to the relay server 2 to which the client terminal 21 itself belongs. The relay server to which the client terminal 21 belongs can be obtained from the content stored in the belonging relay server information storage unit included in the client terminal 21. Then, the relay server 2 forwards the login request to the relay server 1 that manages the relay server 2 itself (to the relay server 1 whose management-side information storage unit 53 stores the identification information of the relay server 2 itself). Then, in the relay server 1, authentication of the operator ID and passcode is performed in the same manner as described above.

As thus far described, the relay server 2 of this preferred embodiment includes a packet forwarding control information storage unit 54 arranged to store the first address filter information and the second address filter information. The first address filter information indicates an address to which the relay server 2 itself is able to forward a packet. The second address filter information indicates an address to which the relay server 3 or the client terminal 47 that is another connecting-target apparatus is able to forward a packet. The relay server 2 includes an identification information receiver unit arranged to receive the identification information (for example, Op1 or Op2) of an operator who is performing a login operation via the communication device 22 connected to the LAN 20; a list obtainment unit arranged to obtain a list of relay servers to which an operator group where the operator belongs is able to connect, based on the identification information of the operator whose login has been received; a selection receiver unit arranged to receive a selection of the relay server selected by the operator from the list of other relay servers obtained; and a routing session establishment unit arranged to establish a routing session with the relay server 3 selected by the operator. The relay server 2 stores, as the first address filter information, the address of the communication device 22 on which the operator has performed the login operation, and transmits the first address filter information to the relay server 3. The relay server 2 receives the second address filter information associated with the relay server 3 or the client terminal 47 from the relay server 3 selected by the operator, and stores it. In a case where the destination address of a packet received from the routing session is included in the first address filter information, the relay server 2 transmits the packet to the destination. In a case where the destination address of a packet received from the communication apparatus is included in the second address filter information, the relay server 2 transmits the packet to the routing session.

This enables the operator to perform communication with another apparatus (for example, the file server 31) by using the routing session established between the relay server 2 and the relay server 3 selected by the operator. In the above-described configuration, the relay server 3 that the operator can select as a partner of the routing session is set for each operator group to which the operator belongs, and an apparatus to which the operator is able to connect is designated in the selected relay server 3 that is actually selected by the operator from selectable relay servers. Accordingly, even when the communication device 22 that the operator uses for logging in is changed, the communication with the same apparatus as before can be performed as long as the operator who is logging in is not changed. Setting of the access control at the operator-group level is made by the relay server 2 itself, and setting of the access control at the operator level is made by the selected relay server 3. This can reasonably and easily achieve a complicated access control.

Next, a modification concerning the operator connection control information storage unit 58 of the relay server 3, 4 according to the second preferred embodiment will be described. FIG. 30 is a diagram showing a modification of the operator connection control information.

FIG. 30 shows operator connection control information stored in the operator connection control information storage unit 58 of the relay server 3 according to the modification. In the operator connection control information according to the modification, unlike the above-described preferred embodiment (FIG. 19), the identification information of the designated apparatus is associated not only with the operator ID but also with information (schedule information) of a time zone. In this example, the operator2 is allowed to use connection between the relay server 3 and the client terminal 47 all day, while being allowed to use connection between the relay server 3 and the client terminal 42 only in a time zone from 0 o'clock a.m. to 6 o'clock a.m.

Configuring the operator connection control information in this manner enables an access control to be achieved in terms of the time zone of connection. The schedule information may be described not only with clock time but also with date (year, month, and day), a day of the week, or the like.

While some preferred embodiments of the present invention have been described above, the above-described configurations can be changed, for example, as follows.

The operator information, the operator group information, the use status information, and the like, may be stored in an appropriate format (such as XML (Extensible Markup Language) format).

Instead of the configuration of the above-described preferred embodiments, a configuration is also acceptable in which an external server used for communication between relay servers is placed on Internet and caused to exert a function as an SIP (Session Initiation Protocol) server, so as to perform communication.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A relay server comprising:
a storage unit arranged to store first address filter information and second address filter information, the first address filter information indicating an address to which the relay server is able to forward a packet, the second address filter information indicating an address to which a connecting-target apparatus that represents another relay server and a client terminal is able to forward a packet;
an identification information receiver unit arranged to receive identification information of an operator who is performing a login operation via a communication apparatus connected to a LAN;
a list obtainment unit arranged to obtain a list of the connecting-target apparatuses to which the operator is able to connect, based on the identification information of the operator whose login has been accepted;
a selection receiver unit arranged to receive a selection of the connecting-target apparatus selected by the operator from the list of the connecting-target apparatuses to which the operator is able to connect; and
a routing establishment unit arranged to establish a routing session with the connecting-target apparatus selected by the operator; wherein
the relay server is configured and programmed to:
store, as the first address filter information, an address of the communication apparatus on which the operator has performed the login operation, and transmit the address of the communication apparatus to the connecting-target apparatus;
store, as the second address filter information, an address received from the connecting-target apparatus;

in a case where a destination of a received packet is stored as the first address filter information, transmit the packet to the destination; and in a case where a destination of a received packet is stored as the second address filter information, transmit the packet to the routing session.

2. The relay server according to claim 1, wherein the list obtainment unit is configured to obtain, as the list of the connecting-target apparatuses, a list of other relay servers to which an operator group where the operator whose login has been accepted belongs is able to connect.

3. A relay server comprising:

a packet forwarding control information storage unit configured to store address filter information in association with identification information of the relay server, the address filter information indicating an address of a routing target device that the relay server is able to designate as a packet forwarding destination to which a packet is to be forwarded, and to store address filter information in association with identification information of a connecting-target apparatus, the address filter information indicating an address of a routing target device that the connecting-target apparatus is able to designate as a packet forwarding destination to which a packet is to be forwarded, the connecting-target apparatus being a connected-side relay server that is able to connect to the relay server and a client terminal belonging to the connected-side relay server; and a control unit including:

a connecting-target apparatus acquisition control unit configured and programmed to obtain the connecting-target apparatus to which an operator who has made a login request is able to connect, based on connection permission information that is information stored in the relay server or another relay server to which the relay server is able to connect and that is information in which identification information of an operator who is able to log in to a relay communication system including the relay server and the connecting-target apparatus is associated with identification information of the connecting-target apparatus to which the operator is able to connect;

a VPN start control unit configured and programmed to perform a process to start a virtual private network on the connecting-target apparatus selected from the obtained connecting-target apparatuses;

an address filter information communication control unit configured and programmed to store, as address filter information associated with identification information of the relay server, an address of a communication apparatus that the operator has operated for making the login request, into the packet forwarding control information storage unit, and transmit the address filter information to the connecting-target apparatus, and store, as address filter information associated with identification information of the connecting-target apparatus, address filter information received from the connecting-target apparatus, into the packet forwarding control information storage unit;

a routing session establishment control unit configured and programmed to establish a routing session with respect to the selected connecting-target apparatus; and a routing control unit configured and programmed to perform control to, in a case where a destination of a received packet is designated by the address filter information associated with the identification information of the relay server, transmit the packet to the destination, and in a case where a destination of a received packet is designated by the address filter information associated with the identification information of the connecting-target apparatus, transmit the packet to the connecting-target apparatus via the routing session established between the relay server and the connecting-target apparatus.

4. The relay server according to claim 3, further comprising a management-side information storage unit configured to store identification information of a relay server in a manager side that manages relay servers including the relay server; wherein the connection permission information is stored in the relay server on the manager side;

upon reception of a login request from an operator, the control unit accesses the relay server on the manager side based on a content stored in the management-side information storage unit, to obtain the connecting-target apparatus to which the operator who has made the login request is able to connect.

5. The relay server according to claim 3, further comprising a connection permission information storage unit configured to store the connection permission information; wherein upon reception of a login request from an operator, the control unit obtains the connecting-target apparatus to which the operator who has made the login request is able to connect, based on the connection permission information stored in the connection permission information storage unit.

6. The relay server according to claim 3, wherein the connection permission information is information in which information of an operator group including one or a plurality of operators is associated with a designated relay server that is designated as a relay server to which the operators belonging to the operator group are able to connect;

the routing session establishment control unit is configured and programmed to perform control to: establish a routing session between the relay server and a selected relay server that is a relay server selected by an operator from the designated relay servers; and establish a routing session between the selected relay server and a designated apparatus that is designated, from client terminals belonging to the selected relay server, as an apparatus to which the operator is able to connect, based on operator connection control information that is information stored in the selected relay server and that is information in which identification information of the operator belonging to the operator group is associated with identification information of the designated apparatus;

the address filter information communication control unit is configured and programmed to exchange the address filter information with the designated apparatus;

the routing control unit is configured and programmed to perform a control for, in a case where a destination of a received packet is designated by the address filter information associated with the identification information of the designated apparatus, transmitting the packet to the designated apparatus via one or a plurality of routing sessions that connect the relay server and the designated apparatus to each other.

7. The relay server according to claim 6, wherein in a case where the selected relay server is not able to communicate with the designated apparatus, based on an error notified from the selected relay server to the relay server, the control unit is configured and programmed to cause a notification that connection has failed to be displayed on the communication apparatus operated by the operator who has made the login request.

8. The relay server according to claim 6, wherein
in the operator connection control information, the identification information of the operator belonging to the operator group is associated with the identification information of the designated apparatus and schedule information;
the control unit is configured and programmed to, based on the operator connection control information, start a virtual private network using one or a plurality of routing sessions that connect the selected relay server and the designated apparatus corresponding to the operator who has made the login request and a current time to each other.

9. A relay communication system comprising:
relay servers; and
client terminals belonging to the relay servers;
among the relay servers, the relay server functioning as a connecting-side relay server includes:
a packet forwarding control information storage unit configured to store address filter information in association with identification information of the relay server, the address filter information indicating an address of a routing target device that the relay server is able to designate as a packet forwarding destination to which a packet is to be forwarded, and to store address filter information in association with identification information of a connecting-target apparatus, the address filter information indicating an address of a routing target device that the connecting-target apparatus is able to designate as a packet forwarding destination to which a packet is to be forwarded, the connecting-target apparatus being a connected-side relay server that is able to connect to the relay server and a client terminal belonging to the connected-side relay server; and
a control unit including:
  a connecting-target apparatus acquisition control unit configured and programmed to obtain the connecting-target apparatus to which an operator who has made a login request is able to connect, based on connection permission information that is information in which identification information of an operator is associated with identification information of the connecting-target apparatus to which the operator is able to connect;
  a VPN start control unit configured and programmed to perform a process to start a virtual private network on the connecting-target apparatus selected from the obtained connecting-target apparatuses;
  an address filter information communication control unit configured and programmed to store, as address filter information associated with identification information of the relay server, an address of a communication apparatus that the operator has operated to make the login request, into the packet forwarding control information storage unit, and transmit the address filter information to the connecting-target apparatus, and store, as address filter information associated with identification information of the connecting-target apparatus, address filter information received from the connecting-target apparatus, into the packet forwarding control information storage unit;
  a routing session establishment control unit configured and programmed to establish a routing session with respect to the selected connecting-target apparatus; and
  a routing control unit configured and programmed to, in a case where a destination of a received packet is designated by the address filter information associated with the identification information of the relay server, transmit the packet to the destination, and in a case where a destination of a received packet is designated by the address filter information associated with the identification information of the connecting-target apparatus, transmit the packet to the connecting-target apparatus via the routing session established between the relay server and the connecting-target apparatus.

10. The relay communication system according to claim 9, wherein
the connection permission information is information in which information of an operator group including one or a plurality of operators is associated with a designated relay server that is designated as a relay server to which the operators belonging to the operator group are able to connect;
the routing session establishment control unit is configured and programmed to perform control to: establish a routing session between the relay server and a selected relay server that is a relay server selected by an operator from the designated relay servers; and establish a routing session between the selected relay server and a designated apparatus that is designated, from client terminals belonging to the selected relay server, as an apparatus to which the operator is able to connect, based on operator connection control information that is information stored in the selected relay server and that is information in which identification information of the operator belonging to the operator group is associated with identification information of the designated apparatus;
the address filter information communication control unit is configured and programmed to exchange the address filter information with the designated apparatus;
the routing control unit is configured and programmed to perform control to, in a case where a destination of a received packet is designated by the address filter information associated with the identification information of the designated apparatus, transmit the packet to the designated apparatus via one or a plurality of routing sessions that connect the relay server and the designated apparatus to each other.

\* \* \* \* \*